United States Patent
Zagaynov et al.

(10) Patent No.: US 10,719,937 B2
(45) Date of Patent: Jul. 21, 2020

(54) AUTOMATED DETECTION AND TRIMMING OF AN AMBIGUOUS CONTOUR OF A DOCUMENT IN AN IMAGE

(71) Applicant: ABBYY Development LLC, Moscow (RU)

(72) Inventors: Ivan Germanovich Zagaynov, Dolgoprudniy (RU); Stepan Yuryevich Lobastov, Kirov (RU)

(73) Assignee: ABYY Production LLC, Moscow (RU)

( * ) Notice: Subject to any disclaimer, the term of this patent is extended or adjusted under 35 U.S.C. 154(b) by 108 days.

(21) Appl. No.: 15/852,869

(22) Filed: Dec. 22, 2017

(65) Prior Publication Data

US 2019/0197693 A1 Jun. 27, 2019

(30) Foreign Application Priority Data

Dec. 22, 2017 (RU) ................................ 2017145316

(51) Int. Cl.
*G06T 7/13* (2017.01)
*G06T 11/20* (2006.01)
(Continued)

(52) U.S. Cl.
CPC .................. *G06T 7/13* (2017.01); *G06K 9/50* (2013.01); *G06T 7/12* (2017.01); *G06T 7/155* (2017.01);
(Continued)

(58) Field of Classification Search
CPC ........... G01C 3/00; G06T 7/62; G06T 3/0012; G06T 7/13; G06T 19/00; G06T 3/00; G06T 17/00; G06T 5/40; G06T 2200/08; G06T 17/20; G06T 19/20; G06T 2219/2012; G06T 7/70; G06T 7/269; G06T 7/73; G06K 9/00798; G06K 9/00805; G06K 9/4633; G06K 9/32; G06K 2009/363; G06K 9/00463; G06K 9/3283; G06K 9/4604; G06K 9/4671; G06K 9/344; G06K 9/3241;
(Continued)

(56) References Cited

U.S. PATENT DOCUMENTS 5,825,906 A  10/1998  Obata
6,138,045 A  10/2000  Kupinski
(Continued)

OTHER PUBLICATIONS

Grompone, et al. "LSD: a Line Segment Detector", IPOL Journal • Image Processing On Line, Mar. 24, 2012, pp. 35-55, https://doi.org/10.5201/ipol.2012.gjmr-lsd, 21 pages.
(Continued)

*Primary Examiner* — Aklilu K Woldemariam
(74) *Attorney, Agent, or Firm* — Lowenstein Sandler LLP

(57) ABSTRACT

Systems and methods for detecting document contours in a digital image. An example method may involve: receiving an image comprising one or more documents and detecting a set of lines in the image; identifying a plurality of intersection points corresponding to the set of lines; determining a vanishing point based on the plurality of intersection points; generating a candidate polygon based on the set of lines; evaluating the candidate polygon based on a parameter associated with the vanishing point; and indicating the candidate polygon represents a contour of one of the one or more documents.

20 Claims, 31 Drawing Sheets

(51) Int. Cl.
  *G06K 9/50* (2006.01)
  *G06T 7/12* (2017.01)
  *G06T 7/155* (2017.01)
(52) U.S. Cl.
  CPC ........ *G06T 11/203* (2013.01); *G06K 2209/01* (2013.01); *G06T 2207/10024* (2013.01); *G06T 2207/20032* (2013.01); *G06T 2207/20036* (2013.01); *G06T 2207/20076* (2013.01); *G06T 2207/20081* (2013.01); *G06T 2207/20132* (2013.01); *G06T 2207/20164* (2013.01); *G06T 2207/20192* (2013.01); *G06T 2207/30176* (2013.01); *G06T 2207/30244* (2013.01)
(58) Field of Classification Search
  CPC ... G06K 9/6202; G06F 17/50; G06F 17/2785; H04N 1/3878; G06Q 10/0637; G06Q 20/12; G06Q 20/204; G06Q 20/40; Y04S 10/54; B60W 30/09
  USPC ....... 382/103, 117, 128, 174, 170, 180, 190, 382/195
  See application file for complete search history.

(56) References Cited

U.S. PATENT DOCUMENTS

| | | | |
|---|---|---|---|
| 6,434,277 B1* | 8/2002 | Yamada | G06T 11/60 345/419 |
| 7,110,602 B2 | 9/2006 | Krause | |
| 8,224,031 B2* | 7/2012 | Saito | G06K 9/6205 348/187 |
| 8,331,686 B2 | 12/2012 | Lee et al. | |
| 8,811,751 B1* | 8/2014 | Ma | G06K 9/3275 382/199 |
| 8,913,836 B1* | 12/2014 | Ma | G06K 9/3283 382/199 |
| 9,208,403 B1 | 12/2015 | Aviv | |
| 2002/0048400 A1 | 4/2002 | Braspenning | |
| 2002/0126893 A1 | 9/2002 | Held | |
| 2004/0037460 A1 | 2/2004 | Luo | |
| 2004/0037465 A1 | 2/2004 | Krause | |
| 2004/0213460 A1 | 10/2004 | Chen | |
| 2006/0118633 A1 | 6/2006 | He | |
| 2007/0127816 A1 | 6/2007 | Balslev | |
| 2008/0144926 A1* | 6/2008 | Hattori | B60R 1/00 382/154 |
| 2008/0226171 A1* | 9/2008 | Yin | G06K 9/3283 382/174 |
| 2009/0190833 A1 | 7/2009 | Alvino | |
| 2009/0238462 A1 | 9/2009 | Feris | |
| 2009/0274349 A1 | 11/2009 | Cascio | |
| 2010/0027844 A1* | 2/2010 | Akita | G06T 7/269 382/103 |
| 2010/0111400 A1 | 5/2010 | Ramirez | |
| 2010/0318526 A1* | 12/2010 | Nakazawa | G06F 40/30 707/749 |
| 2010/0329513 A1* | 12/2010 | Klefenz | G01C 21/00 382/104 |
| 2011/0050703 A1 | 3/2011 | Artan | |
| 2012/0051606 A1 | 3/2012 | Saikia | |
| 2012/0201423 A1* | 8/2012 | Onai | H04N 1/3878 382/103 |
| 2013/0064435 A1 | 3/2013 | Taerum | |
| 2013/0094764 A1* | 4/2013 | Campbell | G06K 9/32 382/199 |
| 2013/0148883 A1 | 6/2013 | Lee | |
| 2013/0279801 A1 | 10/2013 | Scheuermann | |
| 2014/0270500 A1 | 9/2014 | Li | |
| 2014/0314276 A1* | 10/2014 | Wexler | G06T 3/0012 382/103 |
| 2015/0104106 A1 | 4/2015 | Elinas | |
| 2015/0110392 A1 | 4/2015 | Wang | |
| 2015/0371440 A1* | 12/2015 | Pirchheim | G06T 17/05 345/419 |
| 2016/0014392 A1 | 1/2016 | Liang | |
| 2016/0238737 A1 | 8/2016 | Janet | |
| 2016/0253571 A1* | 9/2016 | Campbell | G06K 9/00 382/195 |
| 2016/0275209 A1* | 9/2016 | Kelly | G06T 19/00 |
| 2016/0350592 A1* | 12/2016 | Ma | G06K 9/4671 |
| 2017/0076169 A1* | 3/2017 | Campbell | G06K 9/344 |

OTHER PUBLICATIONS

Grompone, et al, "A Contrario Line Segment Detection", SpringerBriefs in Computer Science, DOI 10.1007/978-1-4939-0575-1, 2014, http://www.springer.com/us/book/9781493905744?wt_mc=ThirdParty. SpringerLink.3.EPR653.About_eBook#otherversion=9781493905751, 90 pages.

* cited by examiner $$\overline{S}_{(x,y,r)} = \frac{\sum_{p \in P} |\mathbf{pr}|_p}{|P|}, \text{ where } P = \{i_1, i_2, \ldots, i_{17}\}$$

$$H_i = \left| \left\{ p : p \in P \text{ and } \frac{i\pi}{h} <= \theta_p < \frac{(i+1)\pi}{h} \right\} \right|$$

AUTOMATED DETECTION AND TRIMMING OF AN AMBIGUOUS CONTOUR OF A DOCUMENT IN AN IMAGE

REFERENCE TO RELATED APPLICATIONS

The present application claims the benefit of priority under 35 U.S.C. § 119 to Russian Patent Application No. 2017145316 filed Dec. 22, 2017, the disclosure of which is incorporated herein by reference in its entirety for all purposes.

TECHNICAL FIELD

The present disclosure is generally related to image processing and, more particularly, to a method and system that identifies document contours within digital images in preparation for various types of subsequent automated digital-image processing, including cropping, optical character recognition, or perspective modification.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents. Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
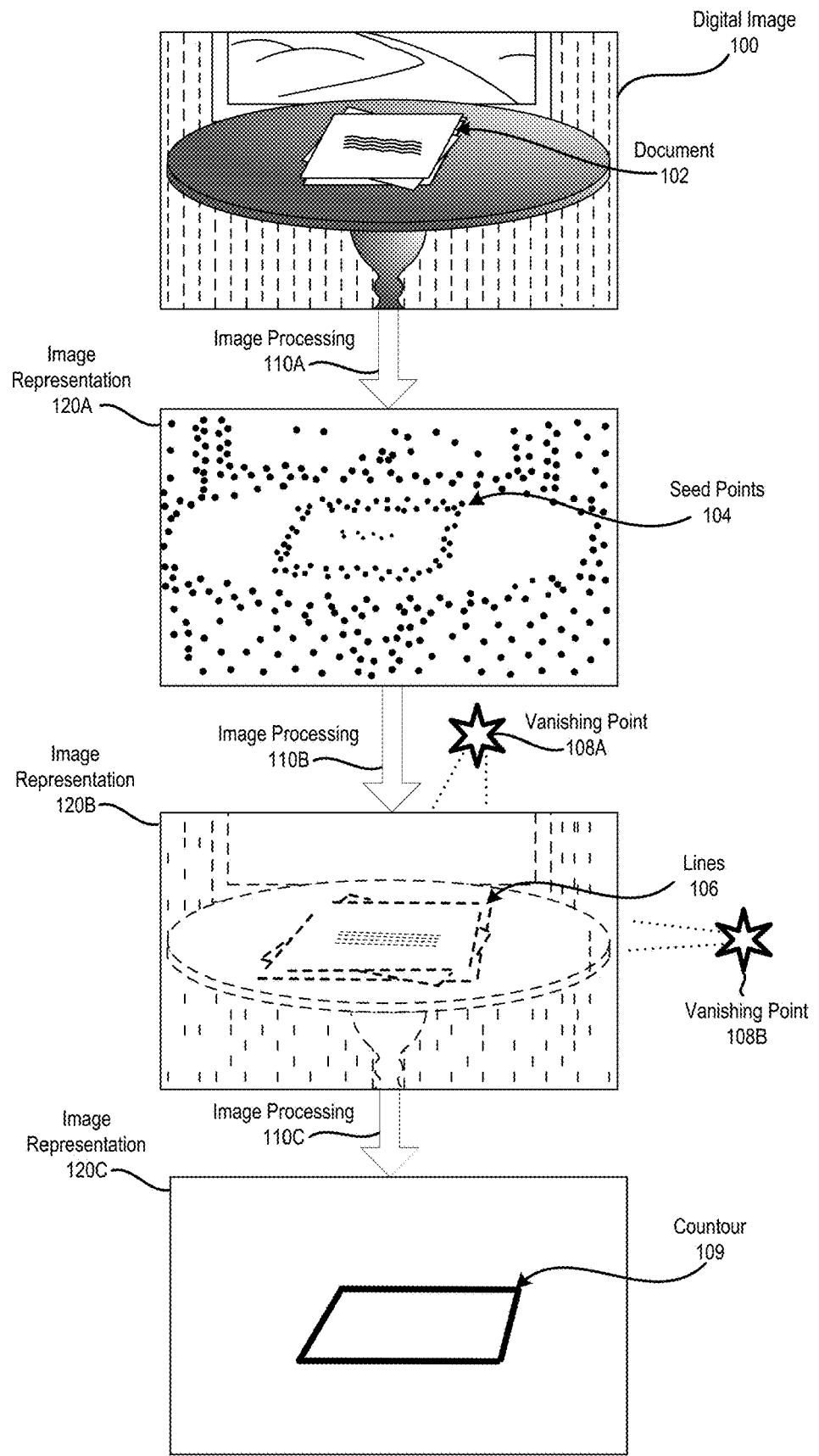
FIG. 1 illustrates example general approach to an analysis of a digital image to detect a contour of an object, in accordance with one or more aspects of the present disclosure.

The current disclosure is directed to methods and systems for enhancing the identification of object contours within digital images. Problems generally arise when attempting to recognize contours of objects that are ambiguously represented in an image. A contour of an object may be ambiguously represented by an image when the object is partially covered, rotated within the image, crumpled, or affected by an optical distortion (e.g., perspective). For example, there may be a problem when detecting contours in an image that includes multiple documents with portions that are overlapping, non-overlapping, misaligned (e.g., documents rotated differently), aligned, or a combination thereof. Traditional techniques for identifying contours often rely exclusively on tracing a contour using edge detection techniques and may be based on typical geometric properties of objects. The traditional technique may not work well for identifying contours that are ambiguously represented in an image.

Aspects of the present disclosure address the above and other deficiencies by using one or more vanishing points of an image. A vanishing point is an abstract point relative to an image plane that may indicate where parallel lines appear to converge. A vanishing point may be referred to as a point of convergence or direction point and is often affected by a perspective of an image capturing device. The systems and methods disclosed herein discuss determining one or more vanishing points for an image and then evaluating candidate contours based on the one or more vanishing points. In one example, the object may be a document that extends beyond the bounds of the image and two or more vanishing points may be determined relative to the document. A first vanishing point may be determined based on a set of horizontal lines detected in the image and the second vanishing point may be determined based on a set of vertical lines detected in the image. The vanishing points may be used to generate and evaluate one or more candidate polygons that represent the contours of one or more documents in the image. The image may then be transformed in view of a polygon representing a particular document. The transformation may involve cropping the image so that only the particular document remains or modifying the document to adjust perspective.

Systems and methods described herein include technology that enhances the detection of contours of an object within an image. In particular, aspects of the present disclosure may more accurately detect contours of objects that are distorted or hidden. Use of one or more vanishing points may enhance the detection of objects with parallel even though perspective distortion makes the lines appear un-parallel in the image. Aspects of the present disclosure may also reduce the computing resources (e.g., processing power or memory) and may enable a user device (e.g., smartphone, tablet, other computing device) to detect object contours. For example, use of vanishing point may reduce the number of side pairs (e.g., top/bottom and right/left) and therefor the number of candidate polygons that are analyzed.

Various aspects of the above referenced methods and systems are described in details herein below by way of examples, rather than by way of limitation. The examples provided below discuss a contour detection for objects with textual features (e.g., documents) and may include portions that are hidden, crumpled, or outside the boundaries of an image. In other example, contours of other types of objects with or without text may be detected. Although the technique is particularly advantageous for objects with a geometric shape that has one or more parallel lines it may be used to enhance the contour detection of other objects as well.

FIG. 1 illustrates an example of a general approach to using vanishing points for contour identification. The approach is carried out on an example digital image 100 that includes a pile of documents on a table that is positioned near a wall covered with wallpaper in which a window looks out over an outside landscape scene. Digital image 100 may be undergo digital image processing steps 110A-C in order to identify a contour 109 of document 102, which may be on top of the pile of documents. Additional or alternate digital image processing steps may be carried out and they may be used to recognize and classify physical objects in the image, including the table, the pile, the window frame, other features, or a combination thereof. The currently discussed contour-identifying method employs various constraints and parameters to control contour identification in order to identify contours useful for specific purposes.

Image processing 110A-C are example processes used to analyze digital image 100 and may result in image representations 120A-C respectively. Image processing 110A may involve analyzing the pixels of digital image 100 to identify one or more seed points 104 and may result in a seed-point map represented by image representation 120A. Each of the seed points 104 may be a candidate starting point and may correspond to one or more pixels of digital image 100. Image processing 110A may identify seed points 104 because the seed point has an image gradient (e.g., color or brightness intensity) that exceed their neighbors. This is discussed in more detail below in regards to FIGS. 5-8.

Image processing 110B may use seed points 104 to identify lines 106 and vanishing points 108A and 108B. As shown in image representation 120B, lines 106 may include multiple lines corresponding to edges and borders of physical objects. Each of the lines may be based on one or more of the seed points 104 that are extended in one or more directions. Each of the vanishing points 108A and 108B may be identified based on at least two of the lines 106. For example, a candidate vanishing point may be selected based on a pair of lines and evaluated based on how many of the other lines would correspond to the candidate vanishing point. The candidate vanishing point that corresponds to the most lines may be selected. Vanishing point identification and evaluation are discussed below in regards to FIG. 13.

Image processing 110C may use lines 106 and vanishing points 108A and 108B to identify contour 109. Contour 109 may be selected from multiple different candidate polygons that are evaluated in view of a plurality of parameters (e.g., evaluation criteria), which are discussed below in more detail. Each of image processing 110A-C may involve numerous processes. These processes may rely on generating and storing numerous different types of intermediate results and data. Different implementations of the currently disclosed methods and systems may use various different types of data representations and intermediate results. For example, an intermediate result may be a two-dimensional map, with elements corresponding to pixels of the digital image in one implementation, but may, in a different implementation, constitute stored data with references to the original image.

Figure 2:
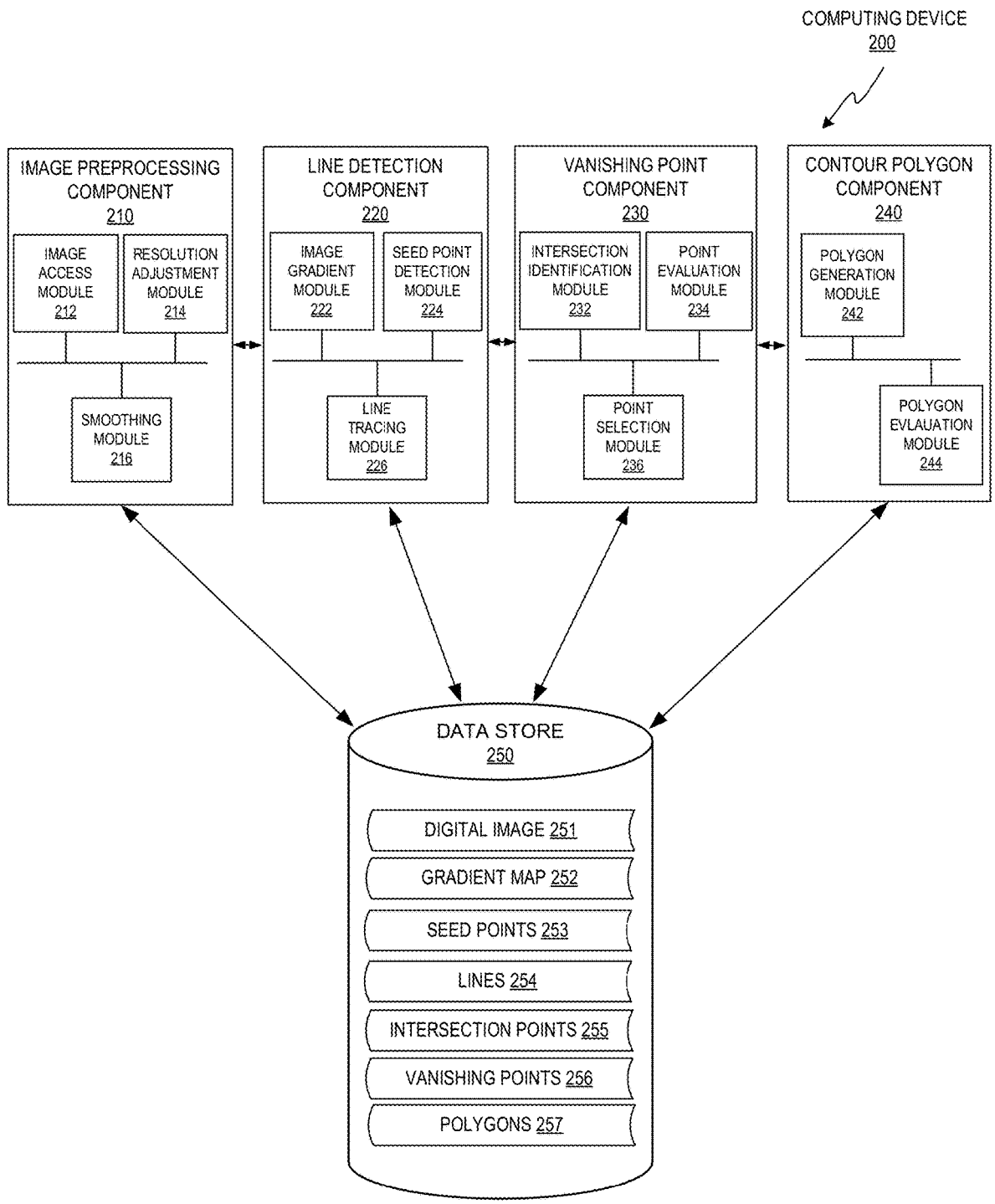
FIG. 2 provides a high-level architectural diagram of a computing device, such as a mobile device in which the currently disclosed contour detection analysis method is employed to obtain a contour of an object, in accordance with one or more aspects of the present disclosure.

FIG. 2 illustrates a block diagram of an example computing device 100 that includes components and modules for performing image processing to identify object contours, in accordance with one or more aspects of the present disclosure. Computing device 100 may include an image preprocessing component 220, a line detection component 220, a vanishing point component 230, and a contour polygon component 240. Computing device 100 may be a user device (e.g., smartphone, tablet, or other mobile device) or may be server device (e.g., cloud service), or a combination thereof. More or less components may be included without loss of generality. For example, two or more of the components or portions of the components may be combined into a single component, or one of the components may be divided into two or more modules. In one implementation, one or more of the modules may be executed by different computing devices (e.g., partially on a user device and partially on a server device).

Image preprocessing component 220 may analyze a digital image and generate one or more data structures that represent and store date of the digital image. Image preprocessing component 220 may modify the digital image to optimize subsequent digital image processing of the digital image. In one example, image preprocessing component 220 may include an image access module 212, a resolution adjustment module 214, and a smoothing module 216.

Image access module 212 may access a digital image 251 received by computing device 100. Digital image 251 may be any format and may be received by computing device 100 over a network or may be captured by computing device 100. Digital image 251 may be accessed at a location local to computing device (e.g., internal storage, removable storage, attached storage) or a location remote from device (e.g., over a network) and may be subsequently stored on data store 250.

Resolution adjustment module 214 may enable the computing device 100 to modify the amount of detail provided by digital image 251 by decreasing, increasing, or altering the image resolution of digital image 251. The image resolution may be represented as a size in pixels and may include a length in pixels and a height in pixels. Resolution adjustment module 214 may modify the length and/or height of a digital image to reduce the amount of detail provided in digital image 251. Resolution adjustment module 214 may modify digital image 251 with or without preserving the aspect ratio of digital image 251. In one example, resolution adjustment module 214 may modify digital image 251 to have an average length and height of approximately 350 pixels and an aspect ratio of approximately 1.0.

Smoothing module 216 may modify digital image 251 by attempting to capture important patterns in the data and removing noise or other visual imperfections (artifacts of resolution modifications). Smoothing module 216 may use one or more different techniques to smooth digital image 251 and the techniques may involve linear or non-linear transformations of digital image 251. Smoothing module 216 may modify digital image 251 based on one or more median filters or gaussian filters as discussed below in regards to FIG. 5.

Smoothing module 216 may also or alternatively perform morphological transformations to extract or erode portions of digital image 251. The morphological transformations may be used to smooth digital image 251 along one or more directional lines and may involve removing "holes" in digital image 251. The morphological transformations may involve selecting pixels and comparing the selected pixels to their surrounding pixels (e.g., neighbors) and keeping the selected pixels with the smallest, largest, or intermediate values. The morphological transformation may involve digital image erosion that reduces the brightness of pixels that are surrounded by neighbors with a lower intensity. Erosion of a point may be the minimum of the points in its particular neighborhood. The neighborhood is discussed in more below and may be defined by a particular structuring element (e.g., matrix). The morphological transformation may include grayscale morphology functions (e.g., grayscale erosion) that are performed for gray-level images (e.g., gray scale image) and binary morphology functions that are performed for binary images (e.g., black and white images).

Line detection component 220 may enable computing device 100 to analyze digital image 251 and identify one or more lines 254. Lines 254 may represent edges of objects in digital image 251. Each of the lines 254 may have a beginning point and an end point and may include at least one seed point. Lines 254 may include straight portions, curved portions, or a combination thereof. In one example, line detection component 220 may include an image gradient module 222, a seed point detection module 224, and a line tracing module 226.

Image gradient module 222 may be used to analyze digital image 251 and identify the image gradients of digital image 251. An image gradient may be a directional change in an intensity in an image. The intensity may be based on the brightness of the pixels and the brightness of a pixel may be based on one or more values of a pixel (e.g., R, G, B), wherein the higher the value the brighter the pixel. The gradient of an image intensity function may be represented by a vector originating at each image point. The vector may be two dimensional and have components given by the derivatives in the horizontal and vertical directions. At each image point, the gradient vector may point in the direction of largest possible intensity increase and the length of the gradient vector may correspond to the rate of change in that direction. The image gradients may be stored in one or more data structures, such as a map, table, or grid, an may include cells that represent points within digital image 251. In one example, the image gradients may be stored in gradient map 252 and represent the gradients at a plurality of points (e.g., all points) within digital image 251.

Seed point detection module 224 may access gradient map 252 and identify a set of seed points 253 within digital image 251. Seed points 253 may be pixels within digit image 251 that are selected because they have intensity gradients (e.g., changes in brightness) that are larger than their surrounding pixels. Seed points 253 may be identified by performing a convolution using a Non-Maximum-Suppression (NMS) kernel. This is discussed in detail in regards to FIG. 6 and may involve accessing gradient map 252 to produce one or more point maps that represent corresponding local maximal gradient magnitudes. Thresholding may be applied to the point maps to determine the points within digital image 251 that contain the largest-valued gradient magnitudes.

Line tracing module 226 may access seed points 253 and may extend one or more of the seed points 253 to produce lines 254. Line tracing module 226 may sort seed points 253 based on brightness or change in brightness and select an initial seed having the largest corresponding value. Line tracing module 226 may analyze the selected seed point in view of gradient map 252 to determine a direction to extend a seed point. The seed point may be extended in one or more directions. When the seed point is extended in only a single direction the seed point may function as the begging or end of a line. When the seed point is extended in multiple directions the seed point may lie along the line but may be neither the beginning point or end point of the line. The determination of the direction or directions to extend a seed point are discussed in regards to FIG. 8-12.

The lines 254 that are detected by line tracing module 226 may include lines external to an object, lines internal to an object, or a combination thereof. Lines external to an object may be the outer edges of an object and lines internal to an object may be lines within the bounds of an object and along content of the object. For example, when the object is a document the external lines may be the linear or non-linear edges of the document and the internal lines may be traced lines along text lines in the document. Both the internal and external lines may be used to identify a contour of an object as discussed below.

Vanishing point component 230 may determine one or more vanishing points 256 for digital image 251. A vanishing point may be referred to as a point of convergence or direction point and may be an abstract point relative to an image plane that indicates where parallel lines appear to converge due to a perspective distortion. Perspective distortion may be a warping or transformation of an object and its surrounding area when captured by an image capturing device. The object as captured may differ from what the object would look like with a normal focal length and with a relative scale of nearby and distant features. Often a perspective distortion will arise when the angle of view of the computing device capturing the image is either wider or narrower than the angle of view at which the image is viewed. In one example, vanishing point component 230 may include an intersection identification module 232, a point evaluation module 234, and a point selection module 236.

Intersection identification module 232 may access lines 254 and identify intersection points 255 that correspond to the lines 254. Intersection points 255 may be referred to as extended intersection point or a hypothetical intersection point because each of the intersection points 255 may indicate the location where at least two separate lines would intersect if one or more of the lines were extended until the lines intersected. An intersection point may be an abstract point along an image plane of the digital image 251 and may lie beyond a boundary of digital image 251.

Intersection identification module 232 may identify intersection points 255 by selecting one or more pairs of lines from lines 254. As discussed above, lines 254 may include external lines that correspond to external edges of an object and internal lines that correspond to content within the edges of the object (e.g., text lines within a document). The internal lines, external lines, or a combination thereof may be used by intersection identification module 232. Intersection identification module 232 may separate lines 254 into one or more sets and a pair of lines may be chosen from the same set or different sets. In one example, lines 254 may be separated into a set of substantially horizontal lines and a set of substantially vertical lines and both lines of a pair may be chosen from the same set. In another example, lines 254 may be separated into four different sets that correspond to candidate lines for an objects top edges, bottom edges, left edges, and right edges respectively. The each line of a pair may be chosen from a different set of lines. For example, a first pair of lines may include a line selected from a set of candidate top edges and a line selected from a set of candidate bottom edges. Likewise, a second pair of lines may include a line selected from the set of candidate left edges and a line selected from the set of candidate bottom edges. In either example, the selection of a pair of lines from a set of lines may be random or may be based on data associated with a point along the line (e.g., seed point, starting point, ending point, intermediate point), a line location, a line length, a line curvature, other data (e.g. evaluation parameter), or a combination thereof.

Intersection identification module 232 may then extend one or more lines of the selected line pair using extrapolation (e.g. linear extrapolation). The extrapolation may involve calculating one or more tangent lines along the line or at an end of the line and estimating a point where tangent lines of the pair of lines cross one another. The point may correspond to one or more coordinates relative to digital image 251. The one or more coordinates may be based on a coordinate system associated with the digital image 251. The coordinate system may be the same or similar to a cartesian coordinate system (e.g., x and y coordinates), cylindrical coordinate system, a spherical coordinate system, other coordinate system, or a combination thereof. Intersection identification module 232 may then add the coordinates to a set of intersection points 255.

Point evaluation module 234 may access the identified intersection points 255 and evaluate the intersection points to determine a vanishing point. Point evaluation module 234 may select multiple intersection points from the plurality of intersection points 255 and may determine the number of lines that correspond to each of the intersection points. Determining whether a line corresponds to an intersection point may involve determining whether the line points toward the intersection point within a predetermined threshold. The predetermined threshold may be based on a predetermined angular offset. The angular offset may be an angular distance (e.g., angular separation) between an extended version of the line and the candidate intersection point. In one example, determining the angular offset may involve determining an angle between the line and a direction to the intersection point. In another example, determining the angular offset may involve determining the angular rotation that would have to be applied to the line in order to make its extrapolation intersect the candidate intersection point. The extrapolation may be the same or similar to the extrapolation technique discussed above in regards to determining an interception point. The predetermined threshold may be adjusted to optimize the detection of vanishing points and may be as an example predetermined value below 15°.

Point selection module 236 may select an intersection point as a vanishing point for digital image 251 in view of the output of point evaluation module 234. Point selection module 236 may use the above evaluation technique to select multiple vanishing points for a particular digital image. For example, a first vanishing point may be determined based on a set of horizontal lines detected in the image and a second vanishing point may be determined based on a set of vertical lines detected in the image, as discussed in more detail below in regards to FIG. 13. In one example, point selection module 236 may select a vanishing point by analyzing multiple intersection points and sorting the intersection points based on the number of corresponding lines. In another example, point selection module 236 may use an iterative machine learning technique to select a vanishing point 256 based on the one or more intersection points 255.

The iterative machine learning process may begin by selecting a current vanishing point value (e.g., default value or randomly selected intersection point coordinates). Point selection module 236 may then evaluate one or more intersection points and compare the number of lines associated with the intersection point with the number of lines associated with the current vanishing point. Point selection module 236 may then replace the current vanishing point with the intersection point when the number of lines corresponding to the intersection point exceed the number of lines corresponding to the current vanishing point. Point selection module 236 may continue to iterate through different intersection points until an exit condition is encountered. The exit condition may be based on the total number of iterations, the number of iterations since the last replacement, the number of available candidates, time, computing resource availability, other condition, or a combination thereof.

In one example, the iterative machine learning technique may involve a Random Sample Consensus (RANSAC) technique. The RANSAC technique may be used to estimate a vanishing point by random sampling data observed in digital image 251 (e.g., lines 254, intersection points 255). Given a dataset whose data elements contain both inliers and outliers, RANSAC may use a voting scheme to find an optimal fitting result. Data elements in the dataset are used to vote for one or multiple models (e.g., intersection points). The implementation of this voting scheme may be based on an assumption that noisy features will not vote consistently for any single model (few outliers) and there are enough features to agree on a good model (few missing data).

The RANSAC technique may involve sampling a subset containing data items that are randomly selected from the input dataset (e.g., intersection points 255 or lines 254). A fitting model and the corresponding model parameters are computed using the elements of this sample subset. The cardinality of the sample subset is the smallest sufficient to determine the model parameters. The technique may involve checking which elements of the entire dataset are consistent with the model instantiated by the estimated model parameters. A data element (e.g., line) may be considered as an outlier if it does not fit the fitting model (e.g., intersection point) instantiated by the set of estimated model parameters within some error threshold that defines the maximum deviation attributable to the effect of noise. The maximum deviation may be the same or similar to the angular offset discussed above. The set of inliers obtained for the fitting model is referred to as a consensus set. The RANSAC algorithm may iteratively repeat the process discussed above until the obtained consensus set in certain iteration has enough inliers.

The RANSAC technique may include multiple steps that involve selecting a random subset of lines 254, which may be referred to as hypothetical inliers. A model may then be fitted to the set of hypothetical inliers. All other data is then tested against the fitted model. Points that fit the estimated model according to some model-specific loss function may be considered as part of the consensus set. The estimated model may be considered better than a prior model if sufficiently many points have been classified as part of the consensus set (e.g., more corresponding lines than a previously analyzed model). Afterwards, the current model may be improved by re-estimating it using all members of the consensus set. This procedure is repeated a fixed number of times, each time producing either a model which is rejected because too few points are part of the consensus set, or a refined model together with a corresponding consensus set size. In the latter case, the refined model is kept if its consensus set is larger than the previously evaluated model.

Contour polygon component 240 may access the data of line detection component 220 and vanishing point component 230 and use it to identify a polygon that best represents the contours of an object in digital image 251. In one example, contour polygon component 240 may include a polygon generation module 242 and a polygon evaluation module 244.

Polygon generation module 242 may generate one or more polygons 257 based on the lines detected by line detection component. Each of the polygons 257 may include a plurality of lines 254 and represent a candidate contour of an object. The plurality of lines that are organized into a chain of lines (e.g., sides). In one example, each line in the chain may be selected from lines 254 and may be extended (e.g., extrapolated) so that the line in the chain intersect with another line in the chain. This may result in a polygon that is referred to as a closed polygon. In another example, at least one line in the chain may not be directly connected to another line within the chain and therefore there may be a gap between sides of the polygon. This may result in a polygon that is referred to as a non-closed polygon (e.g., open polygon). The quantity of lines included in a polygon may vary based on a customizable parameter that depends on the expected quantity of sides of a type of target object. When the type of the target object is a document, the number of lines in the polygon may be four and therefor the polygon may be a quadrilateral. When other types of target objects are selected the number of lines in the polygon may be more or less than four. The generation of polygons is discussed in more detail below in regards to FIG. 15.

Polygon 257 may include one or more lines that extend beyond a boundary of digital image 251. This may be advantageous because digital image 251 may not include the entire object and a portion of the object may exist outside the bounds of the digital image 251. Past image processing techniques may use a boundary of the image as a part of the candidate polygon when a viable alternative is not available. This may result in a contour detection system that fails to generate the correct polygon or fails to evaluate the closest polygon correctly. Enabling one or more lines of the polygon to extend beyond the boundary of the image enables the polygon to more accurately represent the actual contours of the object and also optimizes the evaluation performed by polygon evaluation module 244.

Polygon evaluation module 244 may evaluate multiple candidate polygons generated by polygon generation component 242 and may select a polygon that best represents the contours of an object in digital image 251. Polygon evaluation module 244 may evaluate each polygon based on one or more parameters. The parameters may be based on features of polygon 257, lines 254, vanishing points 256, intersection points 255, seed points 253, digital image 251, other data, or a combination thereof. The example parameters included below may relate to the vanishing points and polygon dimensions. Additional evaluation parameters and techniques are discussed in regards to FIG. 16.

The parameters for evaluating a polygon may be based on one or more dimensions of the polygon. The dimensions of the polygon may refer to measurements of sides, angles, areas, other measurements, or a combination thereof. Example parameters may include: lengths of the sides of polygon 257, the area of the polygon 257, the aspect ratio of polygon 257 relative to the aspect ratio of digital image 251, a ratio of the length of the side of polygon 257 relative to the length of the corresponding detected line 254 it is based on, angles between opposing sides of the candidate polygon (upper and lower sides or left and right sides), angles inside the quadrilateral, angles of convergence of adjacent sides, angles of inclination of the sides with respect to an orientation axis (e.g., axis of coordinate system), location (e.g., coordinates) of the angles of the polygon, a ratio of the average weight of the traced points that overlap a side of the polygon to the average weight of the points that overlap the segment beyond the boundaries of the quadrilateral side, the color of the ColorOut area (e.g., 5 pixels) beyond the bounds of the tracked side for each color channel, a color of the ColorIn area (e.g., 5 pixels) inside the boundaries of the quadrilateral of the traceable side for each color channel, the difference between the colorOut and the colorIn areas.

The parameters for evaluating a polygon may also or alternatively be based on one or more features of the vanishing points 256 or the position of the vanishing points relative to the candidate polygon. As discussed above, one or more vanishing points may be used to evaluate a candidate polygon. The parameters related to the vanishing points may include a number of lines corresponding to the vanishing point, a proportion of the lines relative to the total lines that correspond or do not correspond to the vanishing point, a direction of the line pointing to the vanishing point, a distance to the vanishing point, the distance to a nearest vanishing point and the weight of the nearest vanishing point. The distances may be determined from angles from the lines directed from the centers of opposing sides of the polygon (e.g., horizontal sides or vertical sides).

Polygon evaluation module 244 may combine one or more of the evaluation parameters for a candidate polygon and evaluate them using a machine learning technique. The combination may be a linear or non-linear combination and the machine learning technique may evaluate a prediction model in the form of an ensemble of weak prediction models (e.g., decision trees). The machine learning technique may utilize a boosting aspect that builds the prediction model in a stage-wise procedure and may generalize weak prediction models by allowing optimization of an arbitrary differentiable loss function. In one example, the machine learning technique may be the same or similar to gradient boosting. Gradient boosting may combine weak "learners" into a single strong learner in an iterative fashion. After evaluating one or more candidate polygons, Polygon evaluation module 244 may select the candidate polygon with maximum quality. Polygon evaluation module 244 may then provide an indication that the candidate polygon represents the contours of the object digital image 251.

Figure 3A:
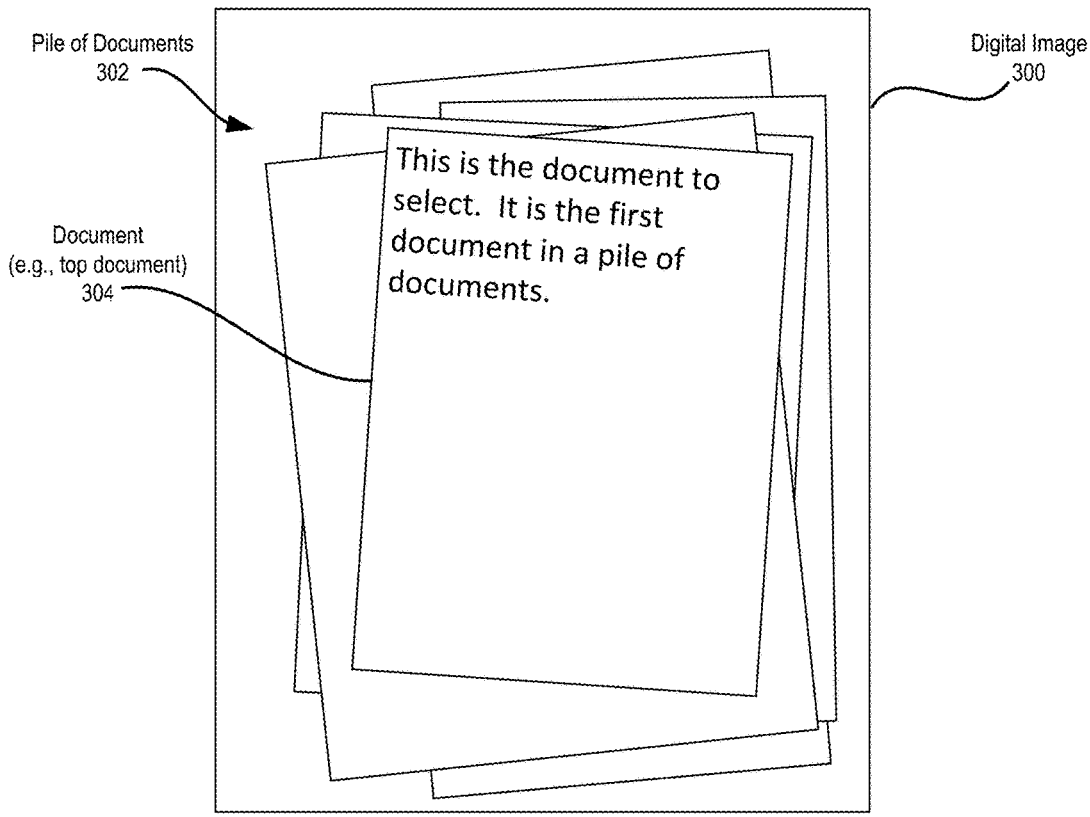
FIG. 3A illustrates an example digital image comprising a pile of documents, in accordance with one or more aspects of the present disclosure.
Figure 3B:
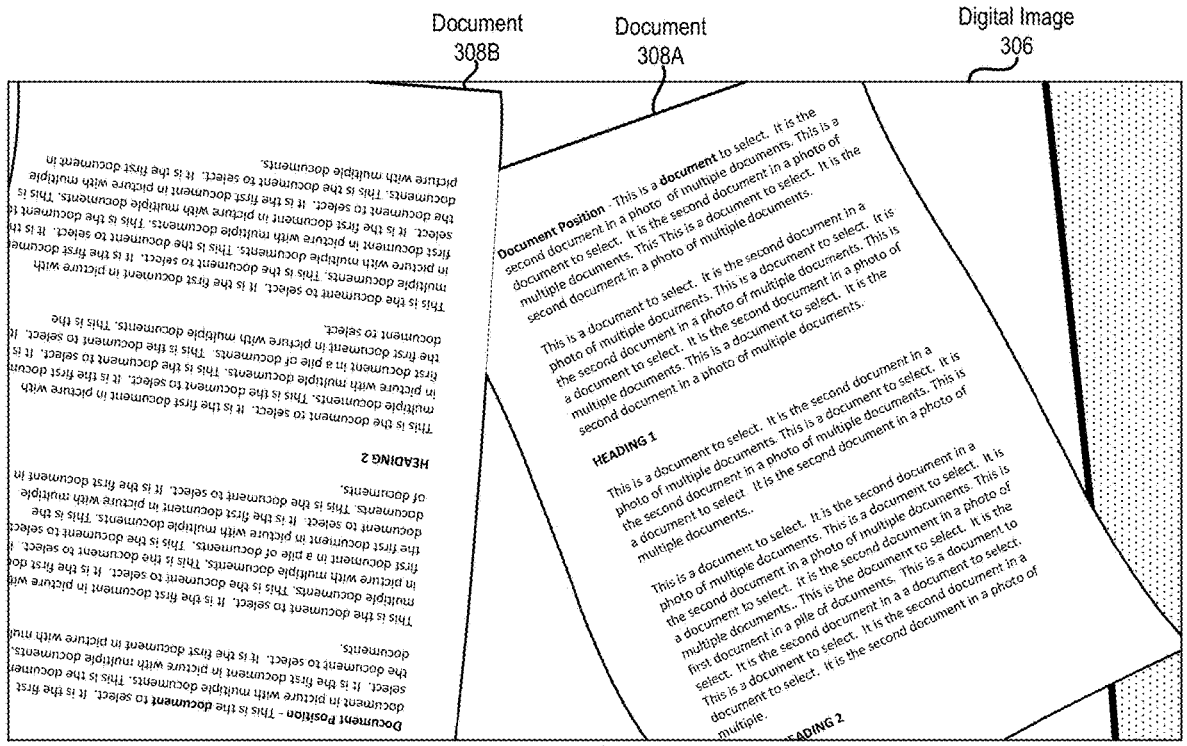
FIG. 3B illustrates an example digital image comprising multiple overlapping documents that extend beyond the boundary of the digital image, in accordance with one or more aspects of the present disclosure.

FIGS. 3A and 3B provide example digital images 300 and 306 that have documents with ambiguous contours. FIG. 3A includes a digital image 300 of a pile of documents 302. Pile of documents 302 may include multiple overlapping documents that are misaligned so that one or more of the documents may be rotated in comparison to the one or more of the other documents in pile 302. Document 304 may be lying on top of pile 302 and may overlap and hide one or more other documents in pile 302. FIG. 3B may include digital image 306 with two overlapping documents 308A and 308B. Documents 308A and 308B may be lying on a table and portions of both documents may lie outside the boundaries of digital image 306 resulting in portions of text on the documents being hidden. Document 308A may be hanging off the table and document 308B may be upside down (e.g., rotated approximately 180°). Neither of the documents may be lying flat on the table and as a result both documents may appear to have edges that are non-linear (e.g., curved). In addition, digital image 306 may have been captured by an image capturing device from an angle which may create a perspective distortion.

It should be noted, that the currently disclosed methods and systems can identify documents with non-linear edges, including documents distorted during the imaging process, due to perspective and other optical effects, documents physically distorted by crumpling or folding, and documents that have curved edges in their normal, physical form. In the example of FIG. 3A, text-containing document 304 and the underlying documents in the pile of documents 302 may have linear and non-linear edges. For ease of illustration and clarity of description, pile of documents 302 is show as having linear edges, but images of documents with non-linear edges are readily recognized by the document-recognition processes discussed below.

FIGS. 4-15 provide detailed, step-by-step illustrations to facilitate a better understanding of an example method and system. The features discussed in this example may be part of a subcomponent of an automated text-recognition system that seeks to identify documents within digital images in order to generate electronic documents that correspond to the pile of documents.

Figure 4:
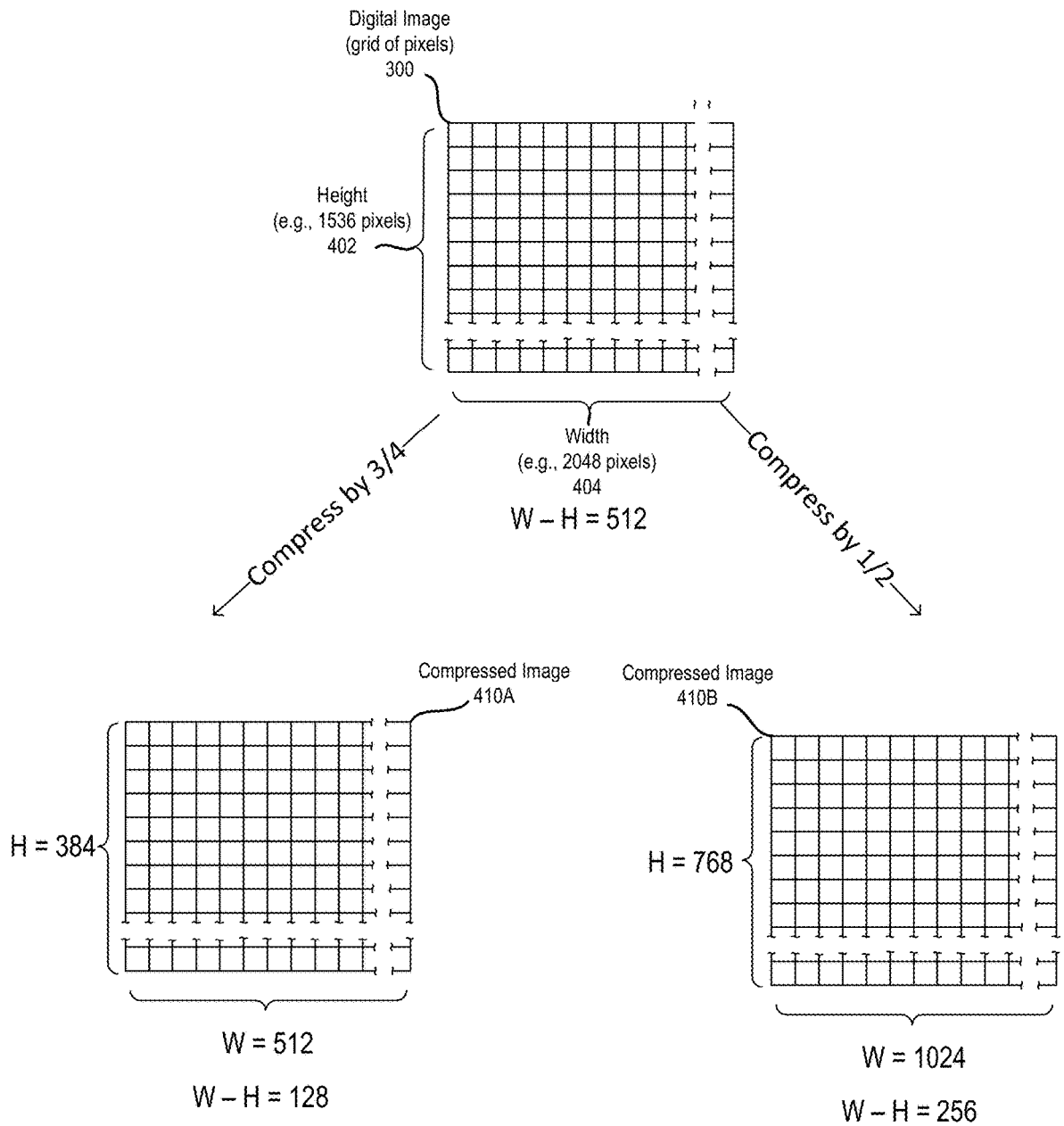
FIG. 4 illustrates a particular implementation of a compression method and subsystem, in accordance with one or more aspects of the present disclosure.

FIG. 4 illustrates a compression of a digital image 300, which may reduce the computing resources occupied by subsequent processing and storage. Digital image 300 may be compressed while keeping the aspect ratio (e.g., height and width proportion) at the same value. Digital image 300 may be represented as a table or grid of cells that correspond to pixel values and may have a height 402 and a width 404 in pixels. In this example, the difference between the height and width of digital image 300 is 512 pixels.

Digital image 300 may be compressed to produce one or more compressed images 410A and 410B, which may be compressed using a different compression ratios. Compressed image 410A may be compressed using a compression ratio of 3/4 (e.g., 75%) and have a difference between the width and height that is equal to 128 pixels. Compressed image 410B may be compressed using a compression ratio of 1/2 (e.g., 50%) and have a difference between the width and height that is equal to 256 pixels. In the currently described implementation, digital image 300 may be compressed, by one or more different compression ratios, to generate one or more corresponding compressed images in which the difference between the width and height of the image is below a threshold number of pixels, such as below 300 pixels. Various different methods can be used to compress the digital image. In one example, the compression may involve detecting evenly spaced rows and columns of pixels and removing them from the original image to generate the compressed images. In another example, the compression may involve smoothing, shifting, and interpolation methods to reduce the possibility that desired details are inadvertently removed or altered during the compression operation.

Figure 5:
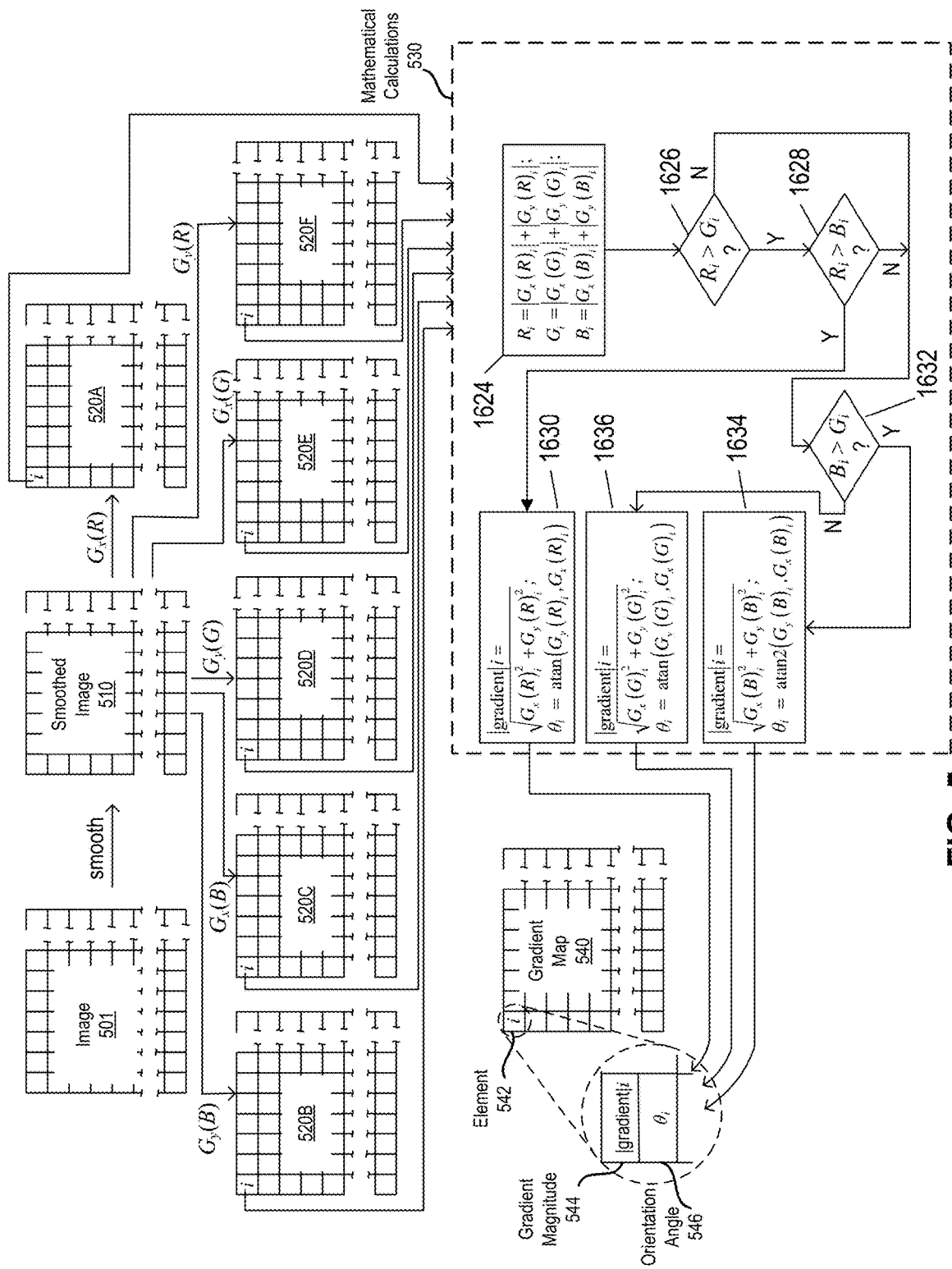
FIG. 5 illustrates a particular implementation of a smoothing method and subsystem, in accordance with one or more aspects of the present disclosure.

FIG. 5 shows another processing step in the example contour detection process where a version of the original image undergoes one or more smoothing operations. The version of the original image may be based on digital image 300 or one the compressed images 410A and 410B of FIG. 4. Image 501 may be smoothed using any digital image smoothing operation and may involve a median filter, a convolution with a Gaussian kernel, other operation, or a combination thereof. The smoothing operation may produce a corresponding smoothed image 510. Horizontal gradient kernel $G_x$ and vertical gradient kernel $G_y$ may be applied to each color channel (e.g., Red Green Blue (RGB)) of the smoothed image. This may produce three pairs of horizontal-gradient and vertical-gradient component maps 520A-F.

For example, the horizontal-gradient-component kernel convolved with the red channel of the smoothed image 510 may produce the horizontal-gradient-component map for the red channel 520A. The notation "$G_i(X)$" is used both to indicate convolution of the gradient-component kernel in the i direction with the X color channel of an image as well as to indicate the gradient-component map produced by the convolution. With the six gradient-component maps 520A-F generated and stored in memory, or, alternatively, generated on the fly, the magnitudes of the gradient components may be determined and used to produce a gradient map 540 (e.g., "grad map"). Each element of the gradient map, such as element 542 (e.g., "i"), includes a respective gradient magnitude 544 and orientation angle 546.

Mathematical calculations 530 illustrate how gradient map 540 is calculated. At 1624, the sum of the absolute values of the gradient components may be computed for one or more of the color channels and may be stored in the variables $R_i$, $G_i$, and $B_i$. When $R_i$ is greater than $G_i$, as determined in step 1626, and when $R_i$ is greater than $B_i$, as determined in step 1628, the gradient for cell or pixel i is computed, in step 1630, using the gradient components for the red channel. When $R_i$ is not greater than both $G_i$ and $B_i$, then, in step 1632, a determination is made whether $B_i$ is greater than $G_i$. When $B_i$ is greater than $G_i$, the gradient magnitude and orientation for cell or pixel i is computed from the blue-channel gradient components, in step 1634. Otherwise, the gradient magnitude and orientation angle are computed from the green-channel gradient components in step 1636.

The calculations illustrated at 1624, 1626, 1628, 1630, 1632, 1634, and 1636 may be repeated for one or more of the pixels (e.g., every cell i) within smoothed image 510. In some example, convolutions are carried out on pixels of an image over which the kernel can be overlaid in which case the map produced by the convolution may have fewer columns and rows than the original map. In other examples, either the original image is extended so the kernels can be applied to all image pixels or modified kernels are used for the border pixels. Gradient map 540 may therefore be map of the magnitudes and orientation angles of the gradients for each pixel (e.g., element 542) of the smoothed image, with the gradient for each pixel based on the color channel of the smoothed image for which the sum of the gradient components is maximum.

Figure 6:
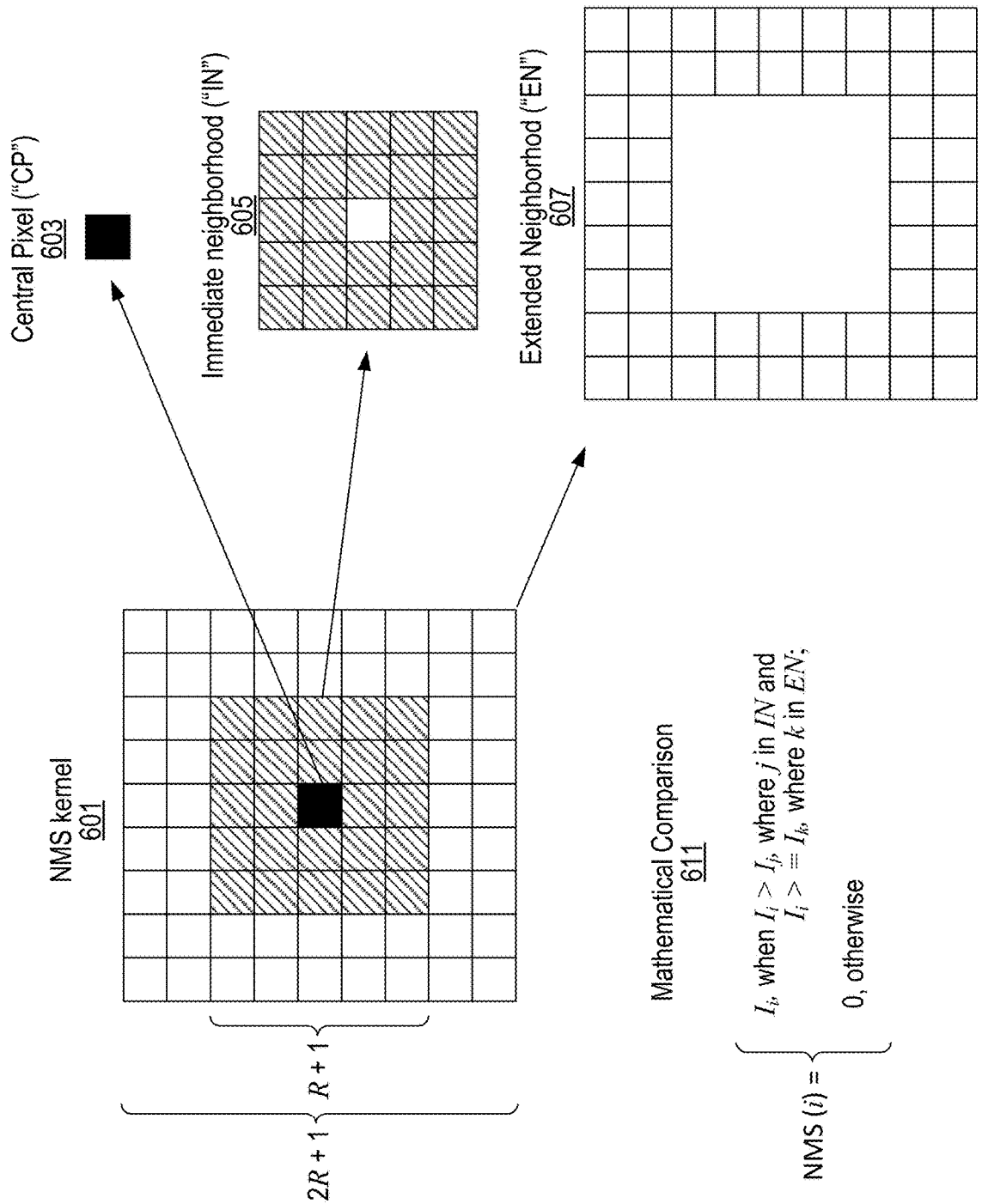
FIG. 6 illustrates a particular implementation of a convolution method and subsystem, in accordance with one or more aspects of the present disclosure.

FIG. 6 illustrates an example of a non-maximum-suppression kernel (NMS) kernel 601. NMS kernel 601 may include three regions: (1) a central pixel 603; (2) an immediate neighborhood 605; and (3) an extended neighborhood 607. Application of the NMS kernel to a pixel may involve overlaying the NMS kernel so that a region of central pixel 603 of NMS kernel 601 overlies the pixel to which the kernel is applied. Application of the kernel determines whether the intensity of the pixel to which the kernel applied is transferred to the result image or map, or whether, instead, a 0 intensity value is transferred to the map or image. When the intensity of the underlying central pixel is greater than the intensity of any underlying pixel of the intermediate neighborhood and when the intensity of the pixel underlying the central-pixel region is greater or equal to the intensity of any pixel underlying the extended neighborhood, the intensity value of the central pixel is transferred to the resultant image or map. Otherwise, the value 0 is transferred to the resultant image or map. This decision process is formally expressed in the mathematical comparison 611. Convolution of the NMS kernel with an image or map selects pixels of the image with local maximal intensities for transfer to the resultant map or image.

Figure 7:
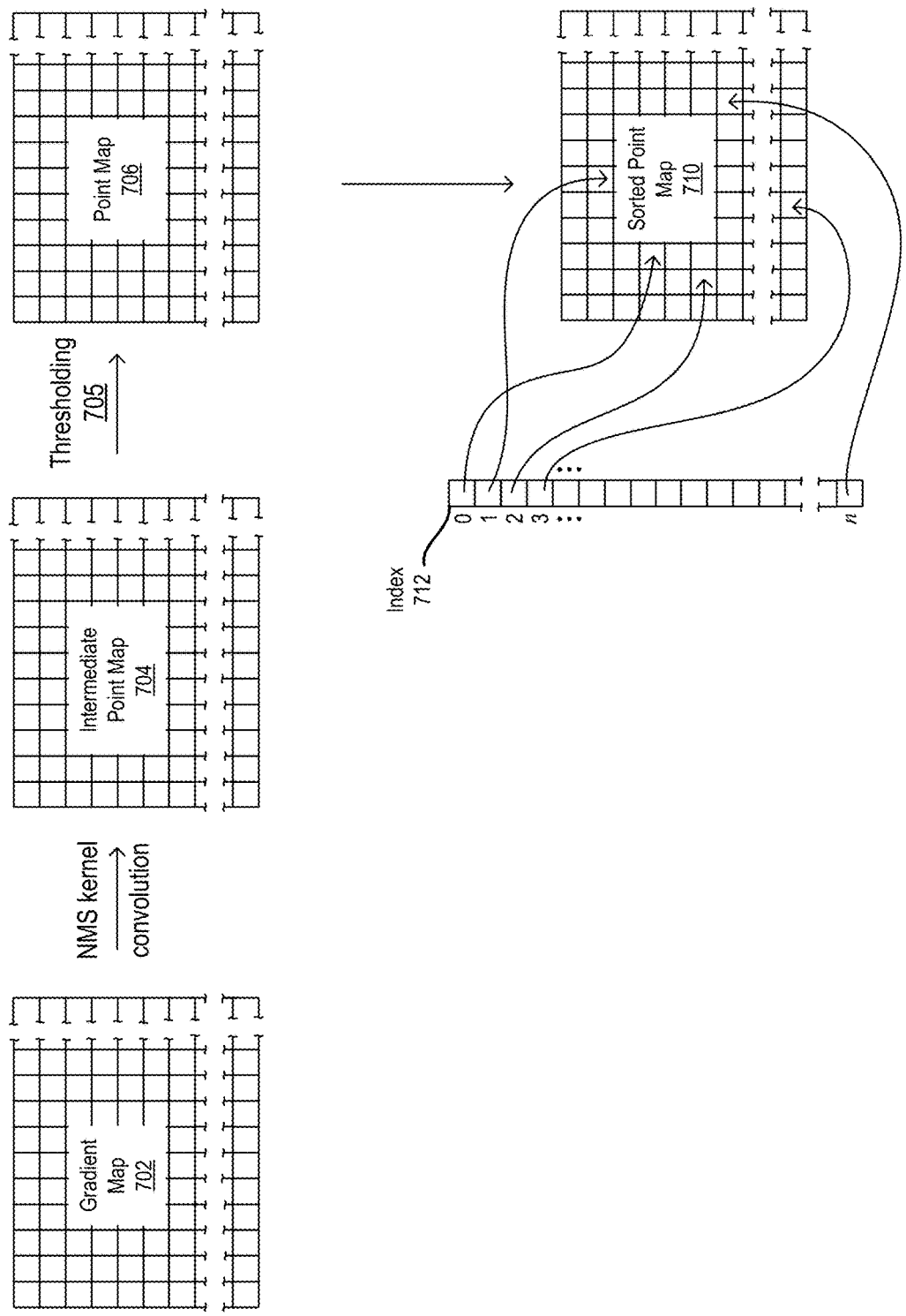
FIG. 7 illustrates a particular implementation of a thresholding method and subsystem, in accordance with one or more aspects of the present disclosure.

FIG. 7 illustrates steps in the example contour detection process for generating a point map with indications of the seed pixels discussed above with reference to seed point map of FIG. 1 (e.g., image representation 120A). Gradient map 702 generated by the process discussed above may be convolved with an NMS kernel to produce an intermediate point map 704. The NMS kernel may consider the gradient magnitude component of each gradient map cell and transfer the local maximal gradient magnitudes from the gradient map to the intermediate point map 704. Thresholding 705 may be applied to intermediate point map 704 to produce a point map 706 that contains the largest-valued gradient magnitudes with the other cells containing the value 0 as a result of NMS-kernel convolution or thresholding. In some examples, a sorted point map 710 and an index 712 may be created that contain references to seed pixels in point map 706. Index 712 may be sorted in descending gradient magnitude order, so that the most promising seed pixels are processed with greater priority than less-promising seed pixels. Alternative examples of the process may use a sorted array of data structures containing the coordinates and gradient magnitudes for one or more seed pixels, rather than retaining a sparse point map.

Figure 8:
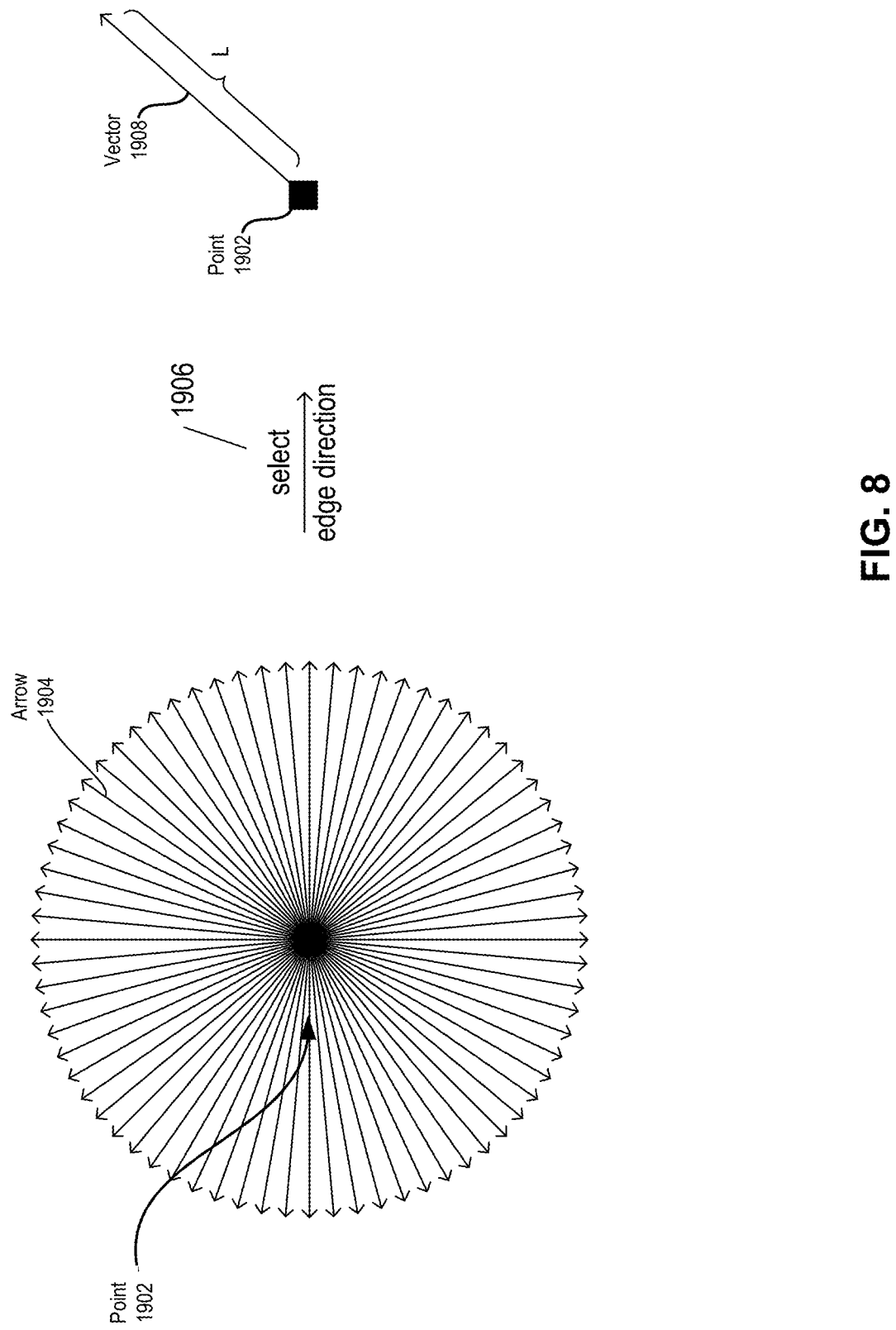
FIG. 8 illustrates a particular implementation of an edge direction detection method and subsystem, in accordance with one or more aspects of the present disclosure.

FIGS. 8-12 illustrate how to determination of a direction to extend a point to produce a line or extend an existing line. The determination of the direction to extend a point may be based on the previously generated point map 706, sorted point map 710, or other seed-point-containing data structures discussed above. FIG. 8 shows an example point 1902 of point map 710 and a plurality of arrows that represent potential edge directions. From a given seed pixel or point within the point map 1902, an initial contour may have one of many possible directions, indicated by arrows, such as arrow 1904. The initial edge-direction selection step 1906 selects a particular direction for a line representing a potential contour and constructs a vector 1908 of length L with a tail coincident with the point 1902 (e.g., seed pixel) and with a direction equal to the selected direction. A line is then a segment with two endpoints corresponding to the tail and head of the constructed vector. In the following discussion, the vectors may be alternatively referred to as "segments," since, as discussed below, a line (e.g., contour, edge) may be represented by elements comprising vectors or segments. The vectors may be a series of head-to-tail vectors and may have a starting point, magnitude, and orientation angle and the segments may have starting and ending points (e.g., coordinates).

Figure 9:
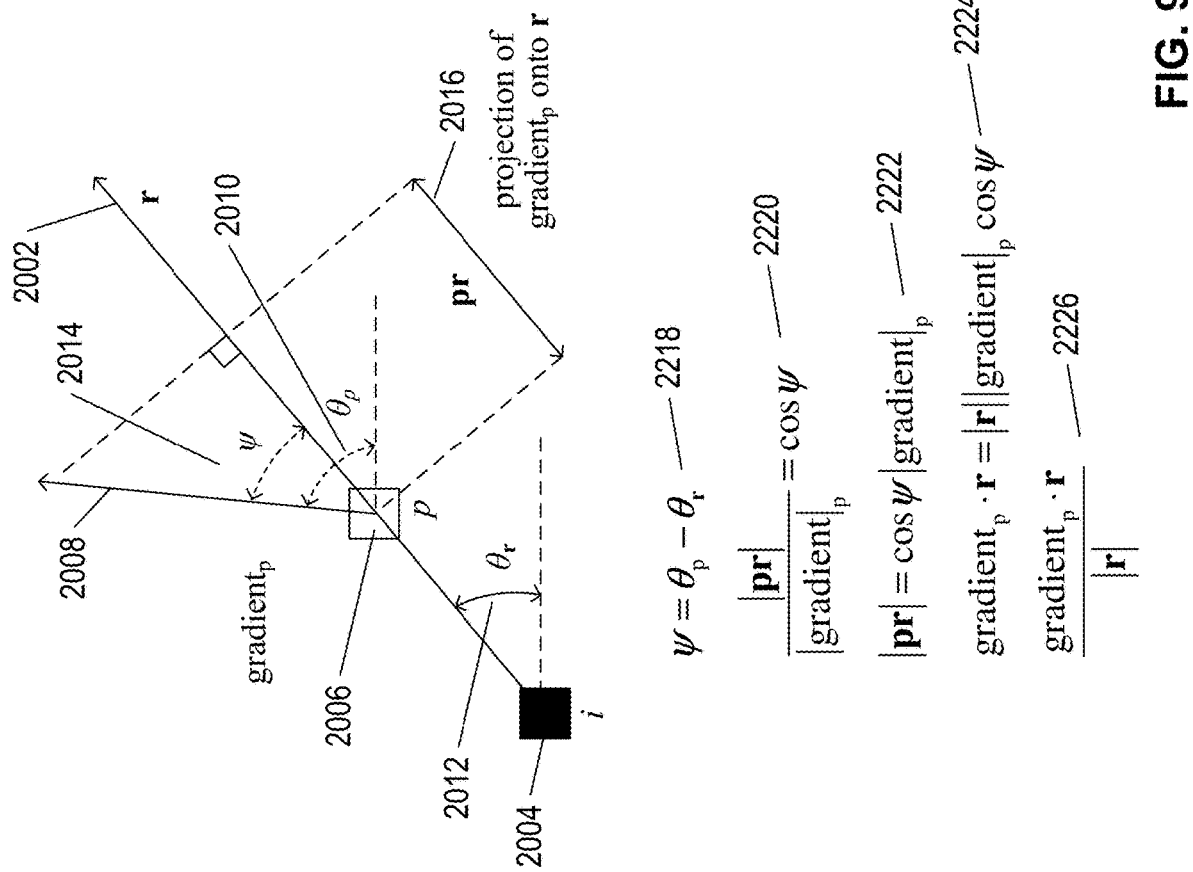
FIG. 9 illustrates a particular implementation of another edge direction detection method and subsystem, in accordance with one or more aspects of the present disclosure.

FIG. 9 illustrates computation of the magnitude of the projection of the gradient of a pixel p along an initial vector r emanating from a seed pixel or seed point i. As shown in FIG. 9 a proposed initial vector r 2002 for the vector coincident with a seed pixel i 2004 is considered during the process of selecting the direction to extend the point to form a line. Pixel p 2006 lies along vector r 2002. There is a gradient vector 2008 associated with pixel p in the gradient map. This gradient vector has an orientation angle $\theta_p$ 2010, also available in the gradient map. Angle 2012, $\theta_r$, is the orientation angle for vector r. The angle $\Psi$ 2014 is the angle between the gradient vector for pixel p and the vector r 2002. The vector pr 2016 is the projection of gradient vector 2008 onto vector r 2002. In the construction shown the angle $\Psi$ is easily computed from orientation angles $\theta_p$ and $\theta_r$ 2218. The ratio of the magnitudes of the vectors pr and the gradient vector for pixel p is equal to the cosine of angle $\Psi$ 2220. Thus, the magnitude of the projection vector pr is obtained as the product of the cosine of $\Psi$ and the magnitude of the gradient vector emanating from pixel p 2222. Alternatively, the dot product of the gradient vector 2002 and the vector r can be used to compute the magnitude of the projection vector pr 2224. Substituting the result 2222 into the dot-product expression produces an expression for the magnitude of the projection vector pr 2226.

Figure 10:
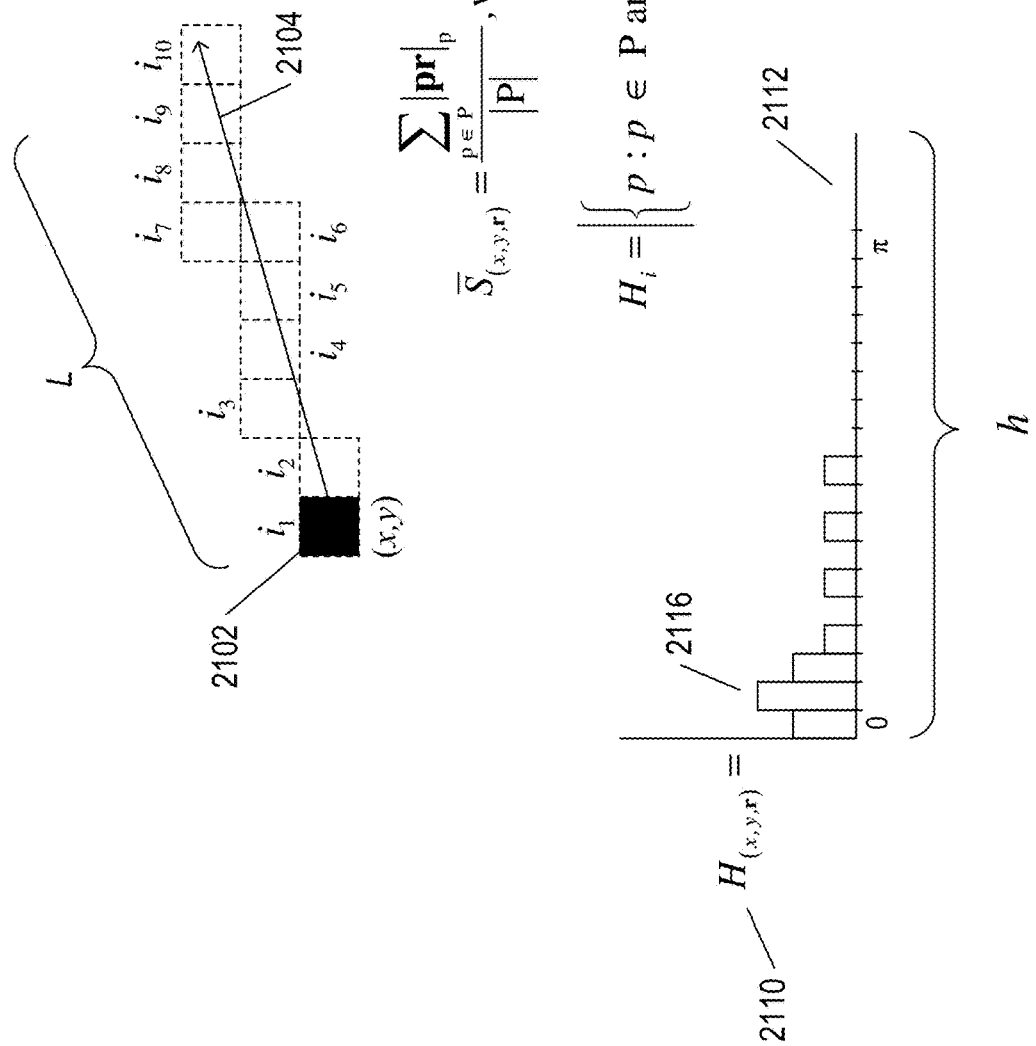
FIG. 10 illustrates a particular implementation of another edge direction detection method and subsystem, in accordance with one or more aspects of the present disclosure.

FIG. 10 illustrates generation of intermediate computed values used for determining a direction to extend a seed pixel. In FIG. 10, a seed pixel with coordinates (x,y) 2102 is shown along with a candidate vector 2104. Two intermediate results, $\overline{S}_{(x,y,r)}$ 2108 and $H_{(x,y,r)}$ 2110 are generated for the candidate vector, where r is vector 2104 and is also referred to as the direction of an edge, in which case the references is actually made to the orientation angle of the vector r. There are 10 pixels, including seed pixel 2102, that underlie the vector 2104 representing a candidate incipient contour. The value $\overline{S}_{(x,y,r)}$ is computed as the sum of the magnitudes of the projections of the vector associated with pixels $i_1$-$i_{10}$ divided by the cardinality of the set of pixels underlying the incipient contour. $H_{(x,y,r)}$ is a histogram 2112 in which the gradient orientations of the pixels underlying the incipient-contour vector are tabulated in histogram bins. As shown by expression 2114, the number of pixels recorded in each bin $H_i$ of the histogram corresponds to the number of pixels with gradient orientations within the range of orientations represented by the bin. The maximally valued bin 2116 generally corresponds to the overall gradient direction of the pixels underlying the incipient contour. When incipient contour is correctly oriented, the direction of the vector 2104 should be generally perpendicular to the gradient directions of the pixels underlying vector 2104.

Figure 11:
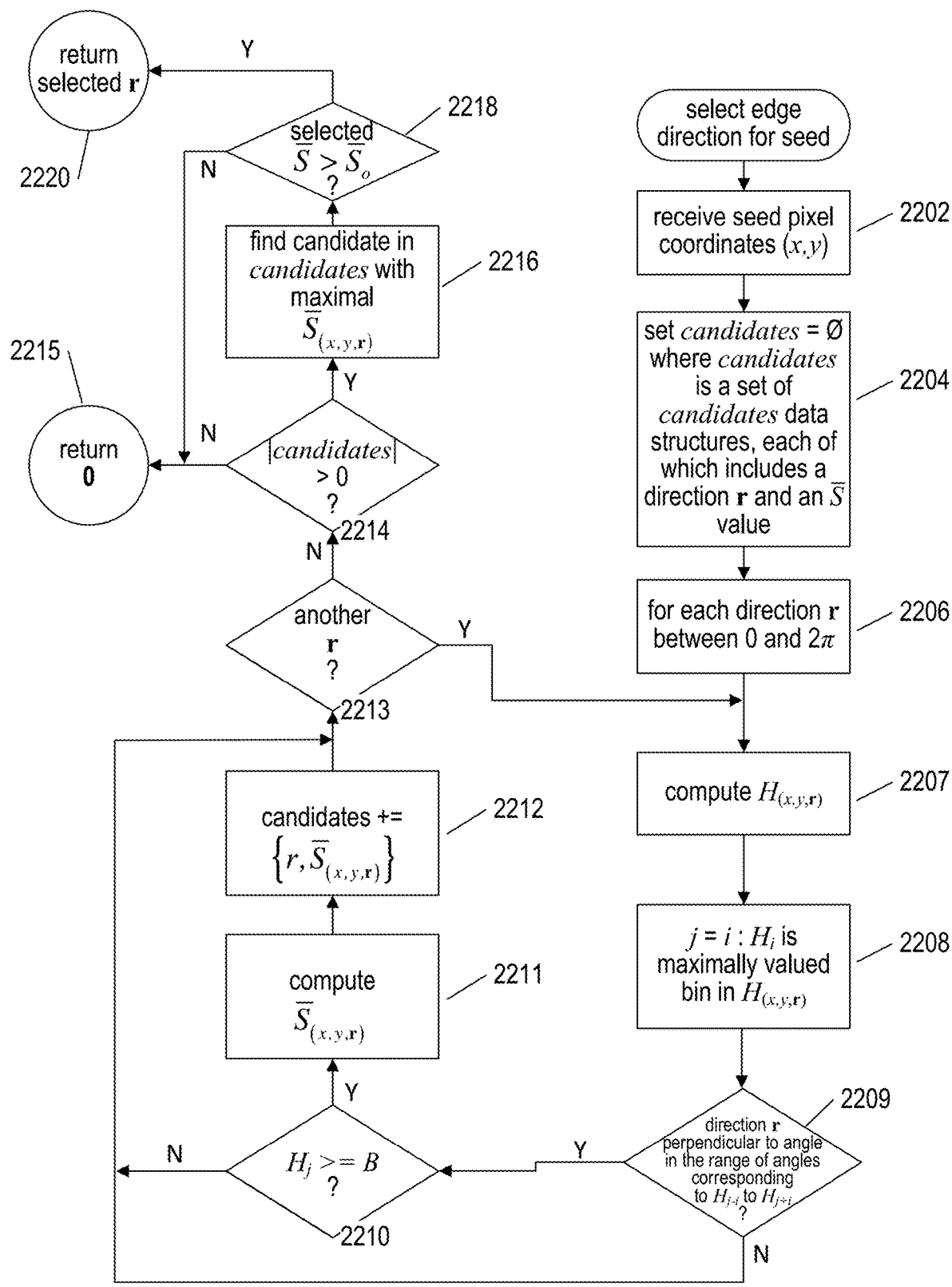
FIG. 11 illustrates a particular implementation of another edge direction detection method and subsystem, in accordance with one or more aspects of the present disclosure.

FIG. 11 provides a control-flow diagram for detecting a direction to extend a seed pixel. In step 2202, the process receives the coordinates for the seed pixel. In step 2204, a candidate set is initialized to the empty set. The candidate set is a set of candidate data structures, each of which includes a direction r and an $\overline{S}$ value. In the for-loop of steps 2206-2213, each direction r between 0° and 360° is considered. Again, note that r is both considered to be a vector and a direction in the current discussion, where the direction is the orientation direction of vector r. In step 2207, the histogram $H_{(x,y,r)}$ is computed for the currently considered direction. The index j is set, in step 2208, to the index of the maximally valued bin in $H_{(x,y,r)}$. In step 2209, determination is made as to whether the direction r is perpendicular to an angle within the range of angles corresponding to the maximum valued bin and its adjacent neighbors.

When the direction r is perpendicular to an angle in this range, then, in step 2210, a determination is made as to whether the value, or number of pixels assigned to, the maximally valued bin is greater than a threshold value B. When this is the case, then, in step 2211, the value $\overline{S}_{(x,y,r)}$ is computed for the currently considered direction and, in step 2212, an entry for the currently considered direction is added to the set candidates. Otherwise, the direction r is removed from the set of candidate directions. Upon completion of the for-loop of steps 2206-2213, when the cardinality of the set candidates is less than 0, as determined in step 2214, then the 0 vector is returned in step 2215 to indicate that no preferred contour direction can be determined for the seed pixel. Otherwise, in step 2216, the member of the set candidates with the greatest $\overline{S}_{(x,y,r)}$ value is selected. When the $\overline{S}$ value for the selected candidate is greater than a threshold value $\overline{S}_0$, as determined in step 2218, the direction r contained in the selected candidate is returned in step 2220. Otherwise, the 0 vector is returned, in step 2215 to indicate that no direction can be determined for the seed pixel. Thus, selection of an initial contour direction for a seed pixel involves selecting a direction that agrees with the directions of the gradient vectors of pixels in the neighborhood of the initial contour, when there is a consensus within the neighborhood with regard to the gradient direction.

Figure 12:
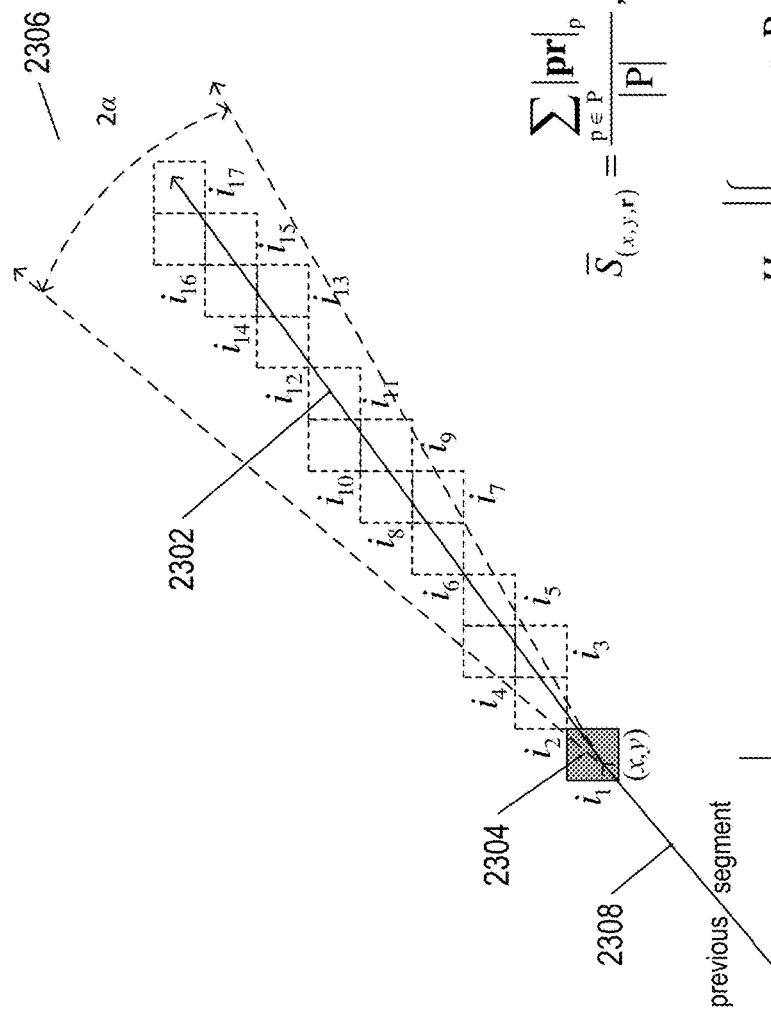
FIG. 12 illustrates a particular implementation of another edge direction detection method and subsystem, in accordance with one or more aspects of the present disclosure.
Figure 12:
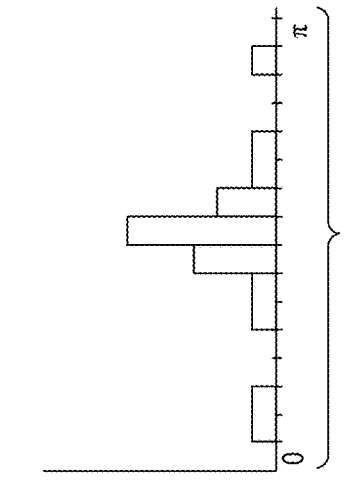

FIG. 12 illustrates selection of a particular direction for an extension of a line. The process for extending a line is the same or similar to the process for selecting an initial direction of a seed point, as discussed above. However, when extending a line the next vector of length L is extended from the endpoint pixel of a line under construction rather than extending from a seed pixel in one or more opposing directions. As shown in FIG. 12, a next candidate vector 2302 is shown extended from the endpoint pixel 2304 of a contour under construction. In this case, only directions within an angle 2a 2306 are considered as candidate directions. In other words, the next segment for the contour 2302 can be inclined with respect to the direction of the previous, already existing segment of the contour 2308 by up to an angle α. Otherwise, the direction-selection process is similar to that for selecting the direction of the initial vectors corresponding to an incipient contour for a seed pixel. Once the lines have been detected the contour detection process may determine one or more vanishing points.

Figure 13:
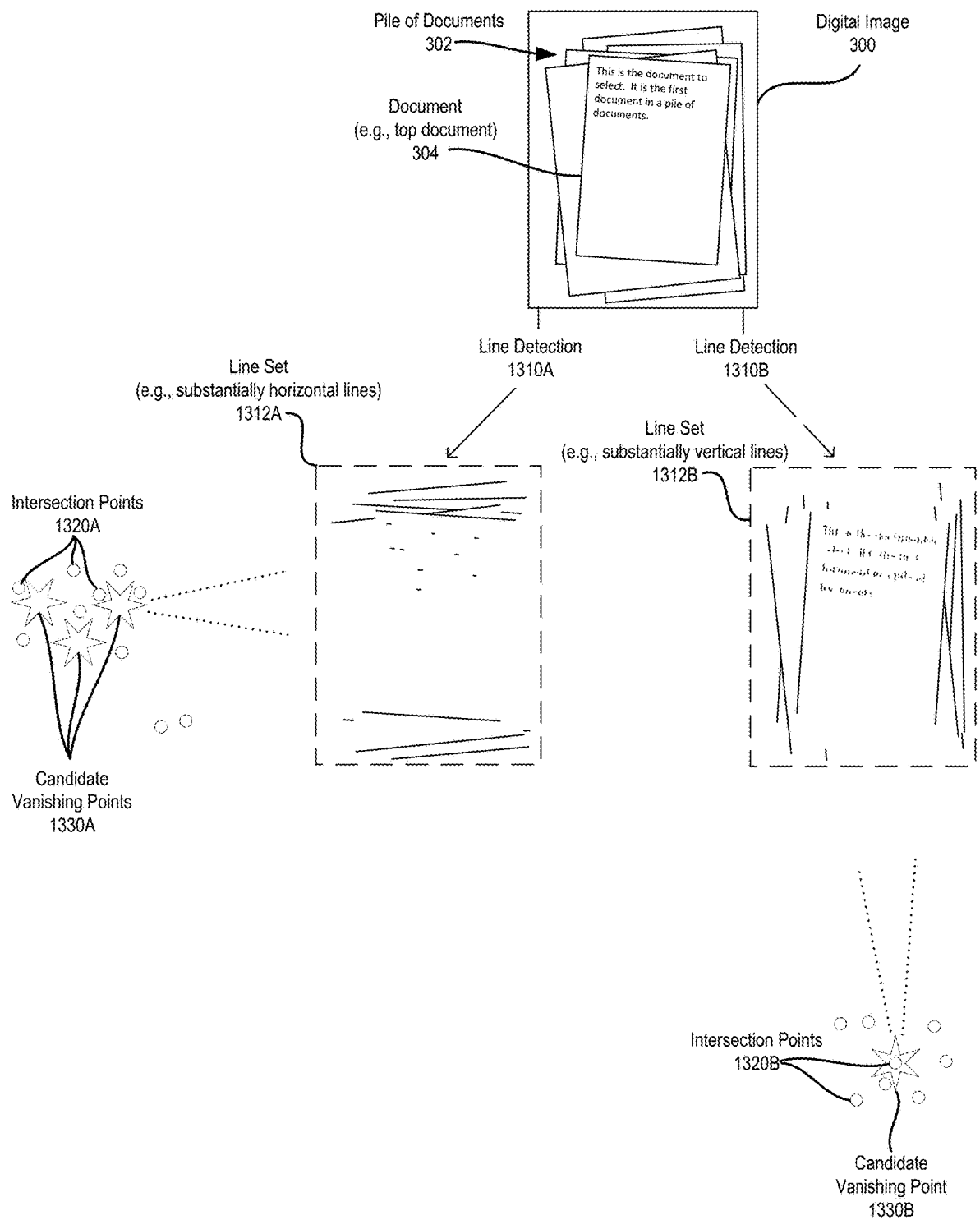
FIG. 13 illustrates a particular implementation of a vanishing point detection method and subsystem, in accordance with one or more aspects of the present disclosure.

FIG. 13 illustrates a process for identifying and evaluating one or more candidate vanishing points 1330A, 1330B of digital image 300. A vanishing point may be referred to as a point of convergence or direction point and may be an abstract point relative to an image plane and may indicate where parallel lines appear to converge due to a perspective distortion. Candidate vanishing points 1330A and 1330B may be determined based on intersection points 1320A and 1320B respectively. Intersection points 1320A and 1320B may be referred to as extended intersection point or a hypothetical intersection point because each intersection point may indicate where at least two separate lines would intersect if one or more of the lines were extended until the lines intersected. The point of the intersection may be an abstract point along the image plane of the digital image 300 and may lie beyond a boundary of digital image 300. In the example shown, there are two different line sets (e.g., horizontal line set and vertical line set) and each line set may used to determine a respective set of intersection points and vanishing points.

Intersection points 1320A, 1320B may be identified by selecting pairs of lines from one or more line sets 1312A, 1312B. Line set 1312A may be based on line detection 1310A and may include substantially horizontal lines and line set 1312B may be based on line detection 1310B and may include substantially vertical lines. As an example, a line may be "substantially horizontal" when it has an orientation direction between 0 and 45° or from 135° to 180° from an orientation axis and may be "substantially vertical" when it has an orientation direction between 45° and 135° from an orientation axis. The orientation axis may default to the horizontal axis of digital image 300 and may be updated when an orientation of digital image is detected.

The selection of a pair of lines from a respective set of lines may be random or may be based on data associated with a point along the line (e.g., seed point, starting point, ending point, intermediate point), a line location, a line length, a line curvature, other data, or a combination thereof. After selecting a pair of lines, one or more lines of the pair may be extended using extrapolation (e.g. linear extrapolation). The extrapolation may involve calculating one or more tangent lines along a line or at an end of the line and estimating a point where tangent lines of the pair of lines cross one another. The point may correspond to one or more coordinates relative to digital image 300. The one or more coordinates may be based on a coordinate system associated with the digital image 300. The coordinate system may be the same or similar to a Cartesian coordinate system (e.g., x and y coordinates), cylindrical coordinate system, a spherical coordinate system, other coordinate system, or a combination thereof. Intersection identification module 232 may then add the coordinates to a set that represents intersection points 1320A and 1320B respectively.

Candidate vanishing points may be selected from the respective sets of intersection points and may be evaluated to determine whether they are actual vanishing points for the image. The evaluation may involve determining the number of lines that correspond to each of the selected intersection points. Determining whether a line corresponds to an intersection point may involve determining whether the line points toward the intersection point within a predetermined threshold. In one example, predetermined threshold may be based on a predetermined angular offset.

The angular offset may be an angular distance (e.g., angular separation) between an extended version of the line and the candidate intersection point. In one example, determining the angular offset involves determining an angle between the line and a direction to the intersection point. In another example, determining the angular offset may involve determining the angular rotation that would have to be applied to the line in order to make its extrapolation intersect the candidate intersection point. The extrapolation may be the same or similar to the extrapolation technique discussed above in regards to determining an interception point. The predetermined threshold may be adjusted to optimize the detection of vanishing points and may be as an example a predetermined value below 5°.

The evaluation techniques discussed above in regards to FIG. 2 may be used to select a vanishing point from multiple candidate intersection points. In the example shown in FIG. 13, a first vanishing point may be determined based on a set of horizontal lines detected in the image and a second vanishing point may be determined based on a set of vertical lines detected in the image. In one example, the selection of each vanishing point may be based on analyzing and sorting multiple intersection points based on the number of corresponding lines and selecting the intersection point that corresponds to the most lines. In another example, point selection module 236 may use an iterative machine learning technique to select a vanishing point based on the one or more intersection points 1320, as discussed above in regards to FIG. 2.

Figure 14:
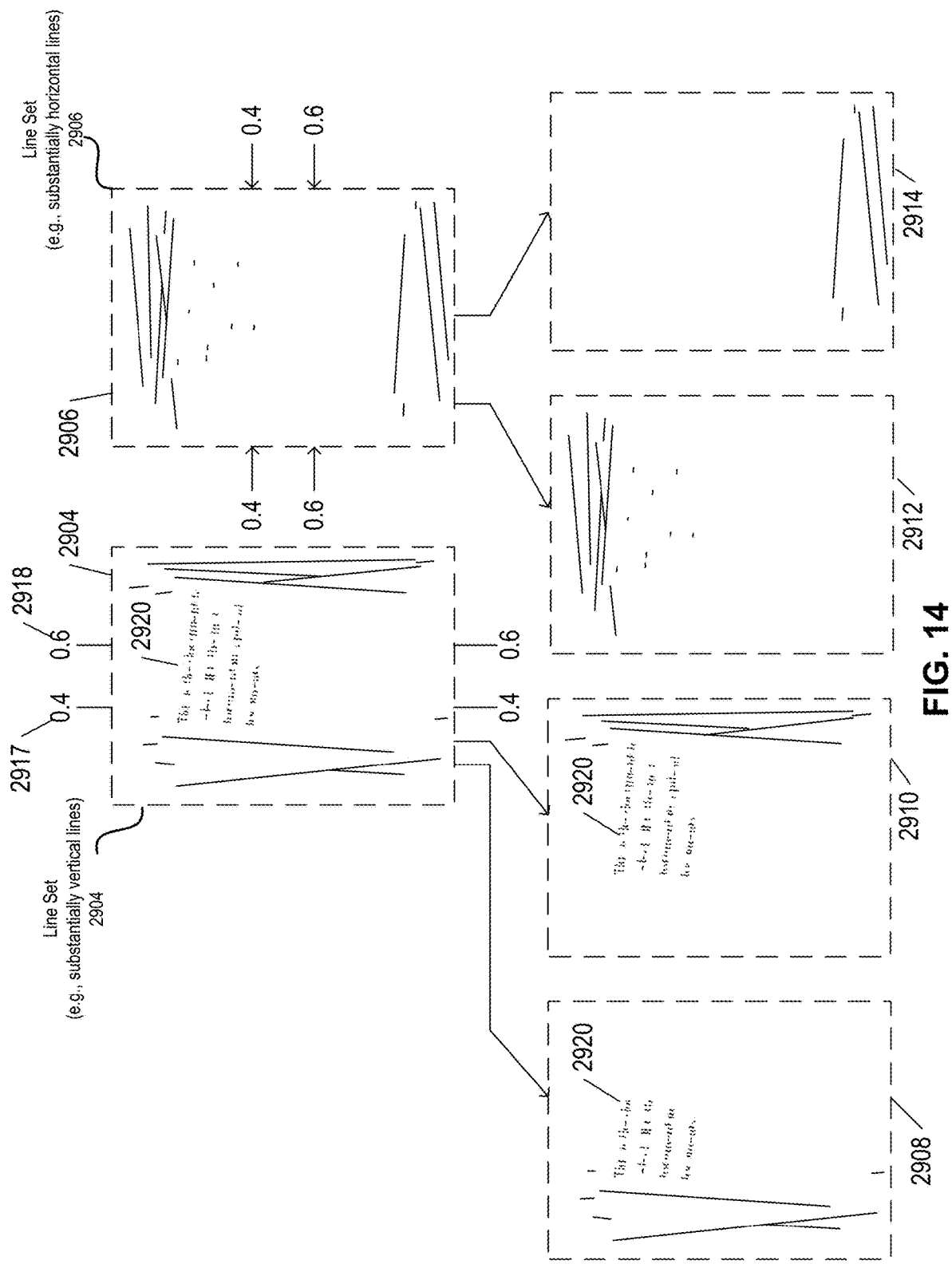
FIG. 14 illustrates a particular implementation of a line grouping method and subsystem, in accordance with one or more aspects of the present disclosure.

FIG. 14 illustrates additional steps in the contour detection process that separates the lines of a digital image into four separate line sets. The lines obtained by application of the example contour detection process are partitioned into a first set of lines 2904 that are substantially vertically oriented and a second set of lines 2906 that are substantially horizontally oriented. As discussed above, the lines having an orientation direction of as an example between 45° and 135° are considered to be substantially vertically oriented, in one implementation, while lines with orientation directions as an example from 0° to 45° and from as an example 135° to 180° are considered to be horizontally oriented. An orientation direction can be obtained for curved lines by using one of many possible methods for fitting a line to a curved line, including commonly used linear-regression methods or simpler geometrical methods, such as approximating a curved line by a line coincident with the endpoints of the curved line or coincident with points near the endpoints of the curved line. The orientation direction for the curved line is then approximated as the orientation direction for the line fitted to the curved line.

Next, as also shown in FIG. 14, the substantially vertically orientated lines 2904 are partitioned into left-side lines 2908 and right-side lines 2910. Similarly, the substantially horizontally oriented lines 2906 are positioned into upper lines 2912 and lower lines 2914. In one implementation, these operations do not constitute a strict partitioning, since certain of the lines may end up in both partitions. In one implementation, the horizontal edge of the substantially vertically oriented line set 2904 may be divided into three vertical sections 2916-2918 defined as follows: (1) a left-hand section 2916 from x=0.0 to 0.4, where x is the coordinate for a horizontal Cartesian axis for the digital image; (2) a central region 2917 from x=0.4 to 0.6; and (3) a right-hand region 2918 from x=0.6 to 1.0. Note that the x coordinates are relative coordinates with respect to a digital-image width of 1.0. The left-hand lines 2908 are those substantially vertically oriented lines in the contour map 2904 contained in the left-hand and central vertical regions 2916 and 2917. The right-hand lines 2910 are those substantially vertically oriented lines that occur in the central 2917 and right-hand 2918 regions of the substantially vertically oriented line map 2904. As a result of this non-strict partitioning, for example, the small set of lines 2920 occur in the right-hand-lines map 2908 and the left-hand-lines map 2910. A similar division of the vertical axis of the substantially horizontally orientated line map 2906 is used to generate the upper 2912 and lower 2914 line maps from the set of substantially horizontally oriented lines 2906.

It should be noted that, for ease of illustration and visual clarity, the sets of lines 2904 and 2906 produced by the first partitioning of the lines of the four sets of lines 2908, 2910, 2912, and 2914 produced by the second non-strict partitioning are shown as images or maps. They may, however, be represented electronically as data structures that include the coordinates of the endpoints of each line, and may be represented in many other ways, as well. In the following discussion, the four non-strict partitions 2908, 2910, 2912, and 2914 are referred to as "line sets," and, in particular, are referred to as the "left lines set" 2908, the "right lines set" 2910, the "upper lines set" 2912, and the "lower lines set" 2914.

In a next step, the four line sets are filtered and sorted by line length or, alternatively, by the number of pixels contained within the lines. The top n lines of each line set are retained for subsequent processing, where n is a parameter. In one implementation, n is equal to 10. Selection of the top n line candidates may be based on length, the number of pixels within the line, or other such criteria. In certain implementations, these criteria are combined with additional criteria, including the average gradient magnitude for pixels within the line, a measure of the uniformity of the gradient direction within the line, and other such criteria. In addition, color information from the original digital image may be used in alternative filtering processes.

Figure 15:
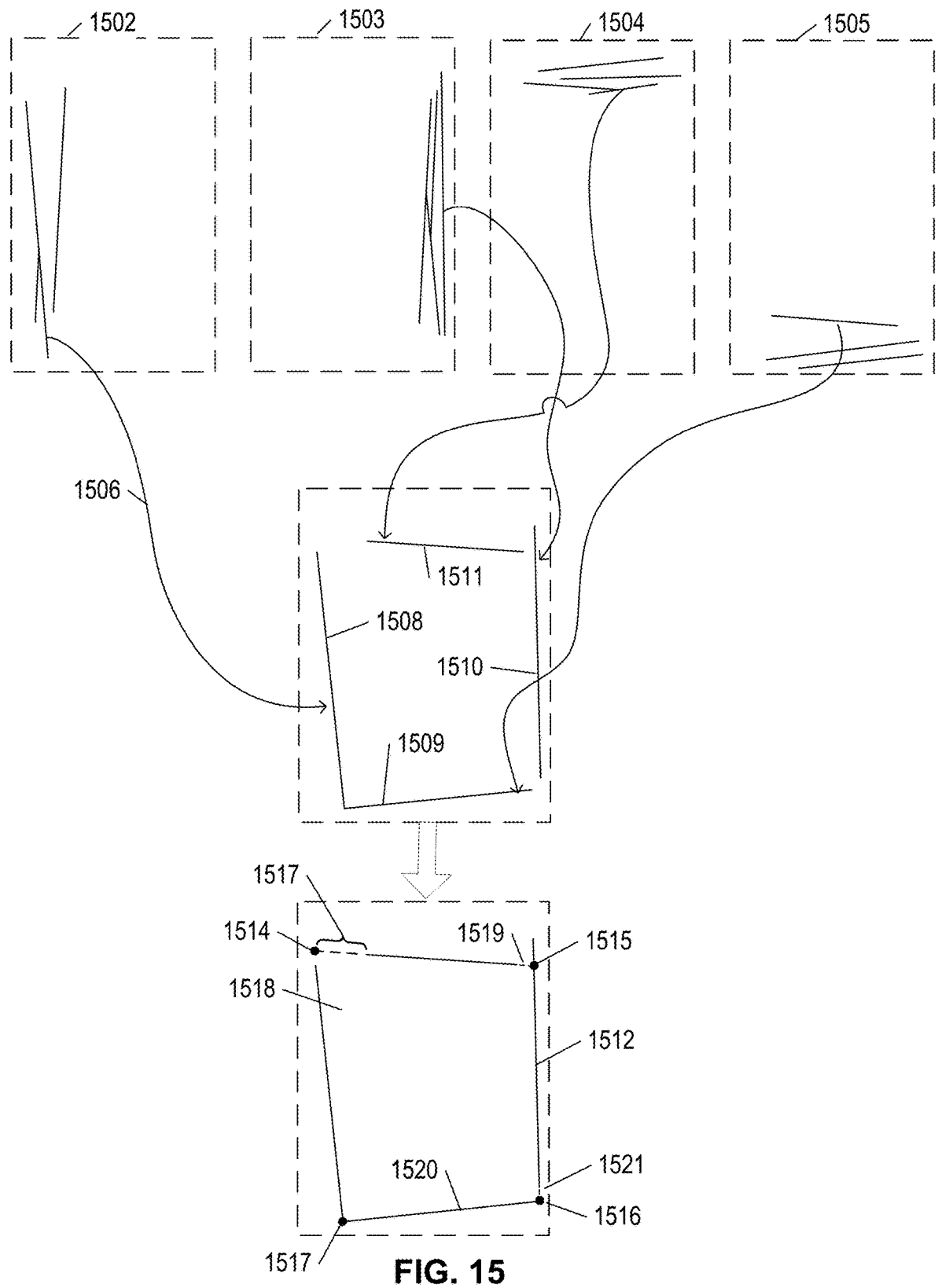
FIG. 15 illustrates a particular implementation of a candidate polygon generation method and subsystem, in accordance with one or more aspects of the present disclosure.

FIG. 15 illustrates the generation of candidate polygons based on the four line sets discussed above. The four line sets are represented by the four line maps 1502-1505. Again, the line sets may be represented by data structures, maps, or any of many other types of representations of a set of lines. One or more of the lines may be curved lines as well as straight lines. A hypothesis is generated by selecting one line, from each line set, and then constructing a polygon from the selected lines. In FIG. 15, curved arrows, such as curved arrow 1506, indicate selection of a line from each line set to produce the arrangement of lines 1508-1511 shown in the left, bottom portion of FIG. 15. Then, lines are extended, as necessary, to form a polygon 1512 with four vertices 1514-1517. Dashed lines, such as dashed lines 1517-1521, represent extension of the lines to form the polygon.

The line extensions can be obtained by any of various line-extension techniques, including determining a best-fitting line to a curved line using linear-regression methods, geometric extension, in which a curved segment is extended along a line connecting two points within the curved segment, or by other methods for fitting lines to curves. Linear segments are straightforwardly extended along the same orientation direction as the linear segment from either or both ends. It should be noted that, although the constructed polygon in FIG. 15 resides entirely within the boundaries of the original image, extension of lines may result in the polygon residing partly outside the boundaries of the original image. For example, line extension of two roughly perpendicular lines may result in constructing a vertex beyond the edge of the original image. A polygon in which a portion of the edges and vertices lie outside the boundaries of the original image are allowed, under constraints discussed below. In general, the currently disclosed methods and systems may construct all possible candidate polygons (e.g., candidate document contours), in other words, all possible combinations of four lines, each selected from a different line set, and evaluate the candidate polygons in order to select a best candidate polygon (e.g., document contour).

Figure 16:
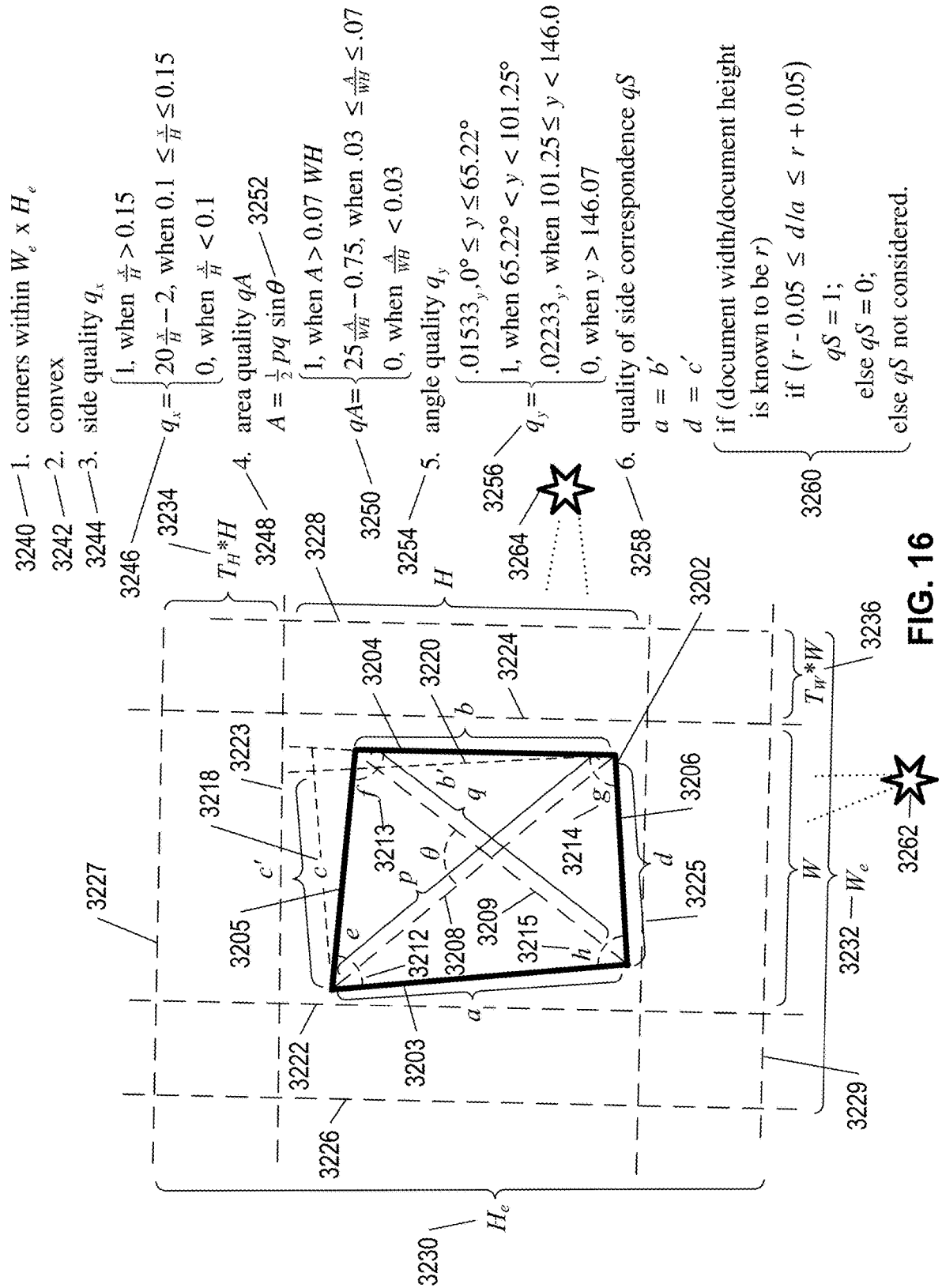
FIG. 16 illustrates a particular implementation of another candidate polygon evaluation method and subsystem, in accordance with one or more aspects of the present disclosure.

FIG. 16 illustrates a number of evaluation parameters for selecting a candidate polygon. As shown in FIG. 16, the parameters used to evaluate a candidate polygon may be based on features of polygons, lines, vanishing points, intersection points, seed points, digital images, other data, or a combination thereof. The candidate polygon 3202 may be a four-sided polygon, or quadrilateral, with sides of lengths a 3203, b 3204, c 3205, and d 3206. The polygon 3202 has two diagonals 3208 and 3209 of lengths p and q. The polygon has four angles e 3212, f 3213, g 3214, and h 3215. In addition, the hypothesis, or polygon 3202, can be straightened into a rectangle having sides of length c' 3218 and b' 3220, as indicated by dashed lines in FIG. 16. The dashed-line rectangle with sides 3222-3225 constitutes the original border of the digital image. This original border is extended, in the geometrical construction shown in FIG. 16, to a rectangle, shown with dashed lines 3226-3229, with height $H_e$ 3230 and width $W_e$ 3232. This extension may be parameterized using the parameters $T_H$ 3234 and $T_W$ 3236, as indicated in FIG. 16.

The right-hand side of FIG. 16 illustrates six different criteria for evaluating a hypothesis. A first criteria 3240 is that the corners of the polygon lie within the larger rectangle of height $H_e$ and width $W_e$, having sides 3226-3229. The second criteria 3242 is that the polygon needs to be convex. A convex polygon has all interior angles less than 180° and is a polygon such that a line segment connecting any two arbitrarily positioned points on the boundary of the polygon does not contain any points exterior to the polygon. A side-quality metric $q_x$ 3244 is computed for each side x of the polygon. This metric has one of three values: 1, $$20\frac{x}{H} - 2, \text{ and } 0,$$

depending on the ratio $$\frac{x}{H},$$

as shown in the expression 3246 in FIG. 16. An area quality metric 3248 is similarly computed, as indicated by expression 3250, from the area of the polygon 3252. The area quality metric qA has one of three values 1, $$25\left(\frac{A}{WH}\right) - 0.75,$$

and 0, depending on the value of the ratio $$\frac{A}{WH}.$$

An angle quality metric $q_y$ 3254 is computed for each angle y of the polygon according to expression 3256. The angle quality metric $q_y$ can take four values that range from 1 to 0, with higher values assigned to angles closer to 90°. A quality metric for side correspondence qS 3258 is computed according to pseudocode 3260 when the ratio of the document width to document height $$\frac{W}{H}$$

is known. In essence, the metric for quality of side correspondence qS has a value 1 when the ratio of the width to height of the straightened polygon, or rectangle, is close to the known document-width to document-height ratio and otherwise has a value of 0.

Vanishing points 3262 and 3264 may also or alternatively be used to evaluate a candidate polygon. Features of the vanishing points 3262, 3264 or the position of the vanishing points relative to the candidate polygon may be used to determine whether a candidate polygon represents the contours of an object (e.g., a document). As discussed above, one or more vanishing points 3262, 3264 may be used to evaluate a candidate polygon. The parameters related to the vanishing points may include a number of lines corresponding to the vanishing point, a proportion of the lines relative to the total lines that correspond or do not correspond to the vanishing point, a direction of the line pointing to the vanishing point, a distance to the vanishing point, the distance to a nearest vanishing point and the weight of the nearest vanishing point. The distances may be determined from angles from the lines directed from the centers of opposing sides of the polygon (e.g., horizontal sides or vertical sides). In addition, the parameters for evaluating a polygon may be based on one or more dimensions of the polygon. The dimensions of the polygon may refer to measurements of sides, angles, areas, other measurements, or a combination thereof. Example parameters may include: lengths of the sides of polygon 3202, the area of the polygon 3202, the aspect ratio of polygon 3203 relative to the aspect ratio of digital image, a ratio of the length of the side of polygon 3203 relative to the length of the corresponding detected line it is based on, angles between opposing sides of the candidate polygon (upper and lower sides or left and right sides), angles inside the quadrilateral, angles of convergence of adjacent sides, angles of inclination of the sides with respect to an orientation axis (e.g., axis of coordinate system), location (e.g., coordinates) of the angles of the polygon, a ratio of the average weight of the traced points that overlap a side of the polygon to the average weight of the points that overlap the segment beyond the boundaries of the quadrilateral side, the color of the ColorOut area (e.g., 5 pixels) beyond the bounds of the tracked side for each color channel, a color of the ColorIn area (e.g., 5 pixels) inside the boundaries of the quadrilateral of the traceable side for each color channel, the difference between the colorOut and the colorIn areas.

Figure 17:
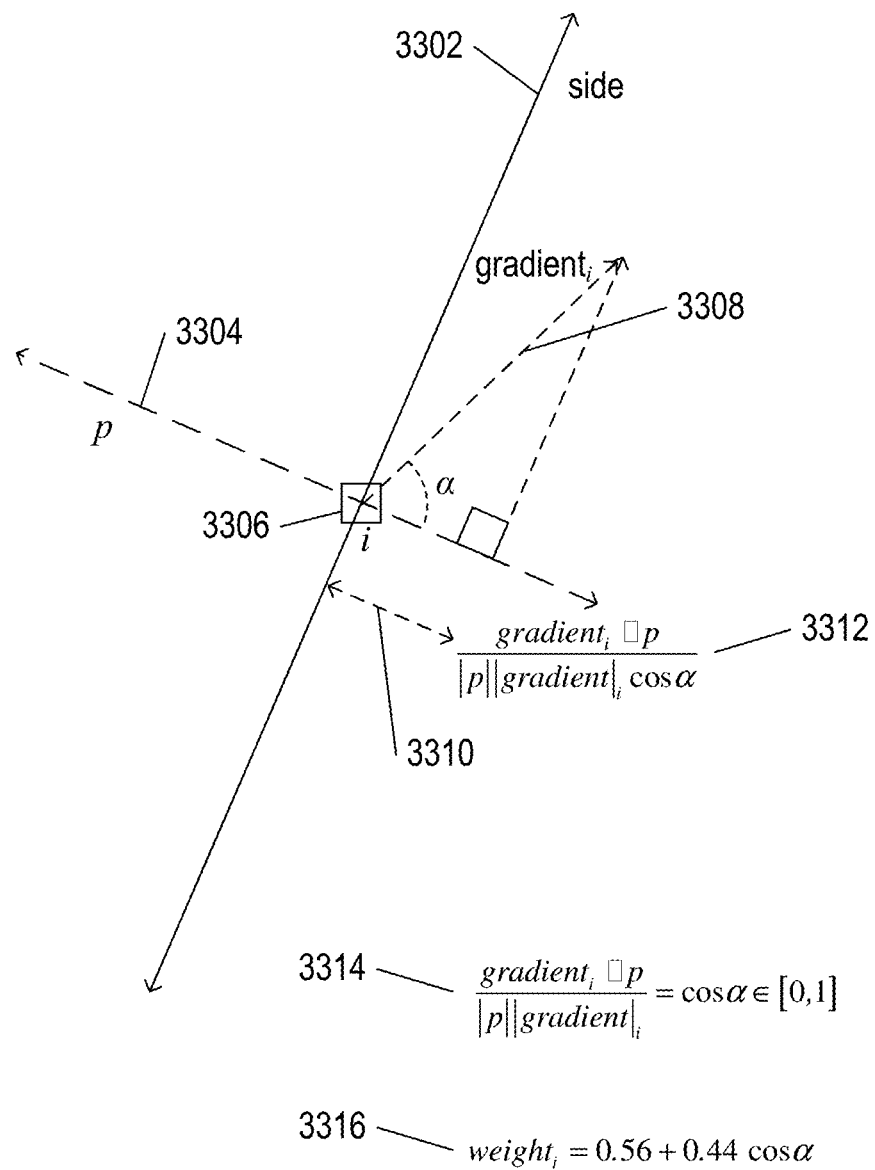
FIG. 17 illustrates a particular implementation of a direction detection method and subsystem, in accordance with one or more aspects of the present disclosure.
Figure 18:
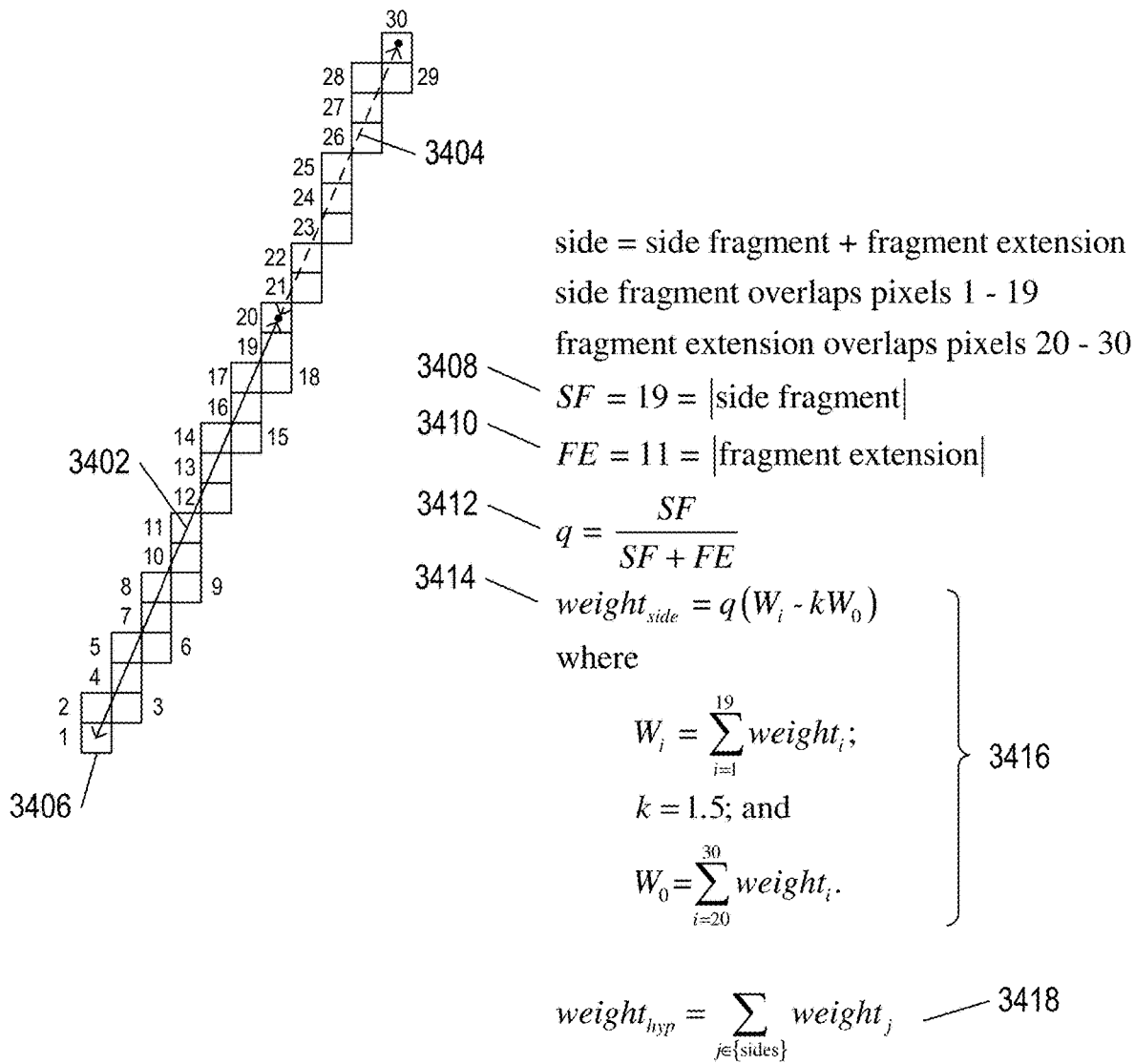
FIG. 18 illustrates a particular implementation of another direction detection method and subsystem, in accordance with one or more aspects of the present disclosure.

FIGS. 17-18 illustrate computation of a side-weight metric value for the hypothesis. FIG. 17 illustrates computation of a weight for a pixel lying within or along one side of a hypothesis. Double-headed arrow 3302 represents the orientation of the side of the hypothesis and dashed double-headed arrow 3304 is a direction p perpendicular to side 3302. A pixel i 3306 lies along the side 3302 of the hypothesis. The pixel is associated with a gradient vector, $gradient_i$ 3308, as discussed in the preceding section. The length of the projection of the gradient 3308 onto a vector p having a direction equal to direction p can be computed from the dot product of the gradient and p, as indicated by expression 3312 in FIG. 17. The angle α 3314 between the gradient associated with the pixel and the direction p is computed by expression 3314 and serves as a numeric indication of how closely the orientation of the gradient of the pixel corresponds to the direction p, having a value 0 when the gradient direct and direction p are perpendicular and the value 1 when the gradient and direction p are parallel. The value of the angle α can then be used in expression 3316 to compute a weight, $weight_i$ for a given pixel i. The closer the gradient associated with the pixel corresponds to a direction perpendicular to the side of the polygon, the greater weight associated with the pixel.

FIG. 18 illustrates computation of a cumulative weight, $weight_{hyp}$, for a hypothesis. In FIG. 18, the side of a hypothesis is represented by a solid double-headed arrow 3402 and a dashed double-headed arrow 3404. Arrow 3402 represents a line and dashed arrow 3404 represents extension of the line in order to create a hypothesis. The arrow is superimposed over a number of pixels, shown with dashed lines, such as pixel 3406, of the original image. The number of pixels overlapped by the line portion of the side, 3402, is equal to SF 3408, which has the numeric value 19 in the example shown in FIG. 18. The number of pixels overlapped by the extension portion of the side FE 3410 has the value 11 in the example shown in FIG. 18. The ratio q 3412 is the ratio SF to SF+FE. The weight for the side, $weight_{side}$ 3414 is computed by expression 3416. The metric $weight_{side}$ has a value based on weights of the pixels of the line $W_i$ and the weights of the pixels associated with the extension portion of the side $W_O$. The side weight metric $weight_{hyp}$ for a hypothesis is the sum of the weights computed for the sides 3418. Alternatively, the average pixel weight can be used to for the values $W_i$ and $W_O$.

Figure 19:
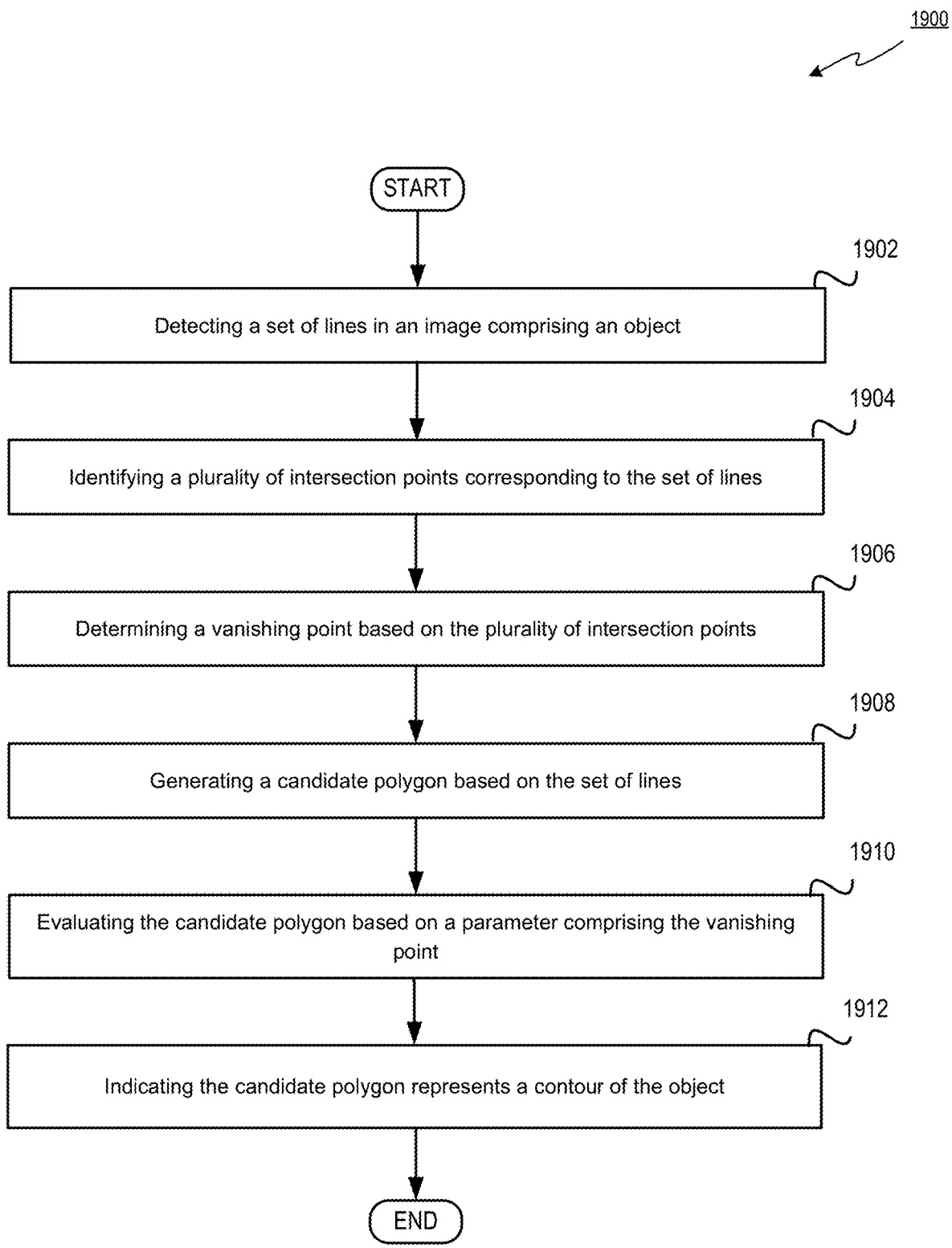
FIG. 19 illustrates a flow diagram of an example method for detecting a contour of an object, in accordance with one or more aspects of the present disclosure.

FIG. 19 depicts a flow diagram of one illustrative example of a method 1900 for utilizing sequence identifiers to reduce spurious wakeups, in accordance with one or more aspects of the present disclosure. Method 1900 and each of its individual functions, routines, subroutines, or operations may be performed by one or more processors of the computer device executing the method. In certain implementations, method 1900 may be performed by a single processing thread. Alternatively, method 1900 may be performed by two or more processing threads, each thread executing one or more individual functions, routines, subroutines, or operations of the method. In an illustrative example, the processing threads implementing methods 1900 may be synchronized (e.g., using semaphores, critical sections, and/or other thread synchronization mechanisms). Alternatively, the processes implementing method 1900 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1900 may be performed by computing device 100 of FIG. 2.

Method 1900 may be performed by a processing device of a computing device (e.g., client device or server device) and may begin at block 1902. At block 1902, a processing device may detect a set of lines in an image comprising an object. The set of lines in the image may include a plurality of lines that are positioned along textual lines of the object. In one example, detecting the set of lines in the image may involve calculating an intensity gradient of a plurality of points (e.g., pixels) within the image and applying an edge thinning operation to the plurality of points to identify a set of points. The edge thinning operation may use the intensity gradient and may involve the use of a non-maximum suppression operation. The detecting may also involve organizing the set of points based on the intensity gradient, wherein the set of points comprises a point with a maximum intensity gradient. The points may then be extended using the maximum intensity gradient along an intensity edge in at least one direction to generate a line segment that is then added to the set of lines.

Detecting the set of lines in the image may involve determining an orientation of an object in the image. The orientation may be determined by detecting a first set of lines that are substantially horizontal and a second set of lines that are substantially vertical. The weight quality may then be determined for the first set of lines and for the second set of lines. The set of lines with the higher weight quality may correspond to the horizontal lines and may be used as a baseline for determining the orientation of one or more documents in the image.

At block 1904, the processing device may identify a plurality of intersection points corresponding to the set of lines. Identifying the plurality of intersection points may involve selecting a pair of lines from the set of lines in the image and identifying an intersection point for the pair of line segments. The intersection point may include a coordinate relative to the image and the processing device may add the coordinate to a set representing the plurality of intersection points.

At block 1906, the processing device may determine a vanishing point based on the plurality of intersection points. Determining the vanishing point may involve selecting a candidate intersection point from the plurality of intersection points and determining a number of lines of the set of lines that correspond to the candidate intersection point. A line may correspond to (related to) or be associated with the candidate intersection point when the line points toward the candidate intersection point within a predetermined angular offset. The determination may also involve replacing a current vanishing point with the candidate intersection point in response to the number of lines that corresponds to the candidate intersection point exceeding a number of lines corresponding to the current vanishing point. In one example, determining the vanishing point may involve detecting multiple vanishing points. A first vanishing point may be based on a plurality of substantially horizontal lines in the image and a second vanishing point may be based on a plurality of substantially vertical lines in the image.

At block 1908, the processing device may generating a candidate polygon based on the set of lines. Generating the candidate polygon based on the set of lines may involve selecting a first pair of lines from the first set and a second pair of lines from the second set. The one or more lines of the first pair or the second pair may be extended to form the candidate polygon. In one example, the object comprises a document and the candidate polygon comprises a closed quadrilateral indicating a contour of the document. The closed quadrilateral may extend past (e.g., beyond) a boundary of the image.

At block 1910, the processing device may evaluating the candidate polygon based on a parameter comprising the vanishing point. The parameter may include multiple different parameters multiple parameters selected from a set comprising: a length of a side of the candidate polygon, an area of the candidate polygon, a coordinate of an internal angle of the candidate polygon, a value of an internal angle of the candidate polygon, a value of an external angle of convergence of the candidate polygon, a ratio between a length of a side of the candidate polygon and a length of a corresponding line from the detected set of lines, an aspect ratio of the candidate polygon, an angle of inclination of a side of the candidate polygon with respect to an axis of the image, a distance to the nearest vanishing point, and a number of the set of lines corresponding to the nearest vanishing point.

At block 1912, the processing device may indicating the candidate polygon represents a contour of the object. The indicated candidate contour may be used to modify the image. Modifying the image may involve at least one of cropping the image based on the candidate polygon, rotating the image based on the candidate polygon, and adjusting the perspective of the image based on the candidate polygon. Responsive to completing the operations described herein above with references to block 1912, the method may terminate.

In an alternate example of method 1900 may also involve receiving an image from a user device comprising an image sensor and reducing a resolution of the image. Reducing the resolution comprises preserving an aspect ratio of the image and reducing a length and a width of the image; and smoothing the image using a Gaussian kernel or median filter.

Figure 20:
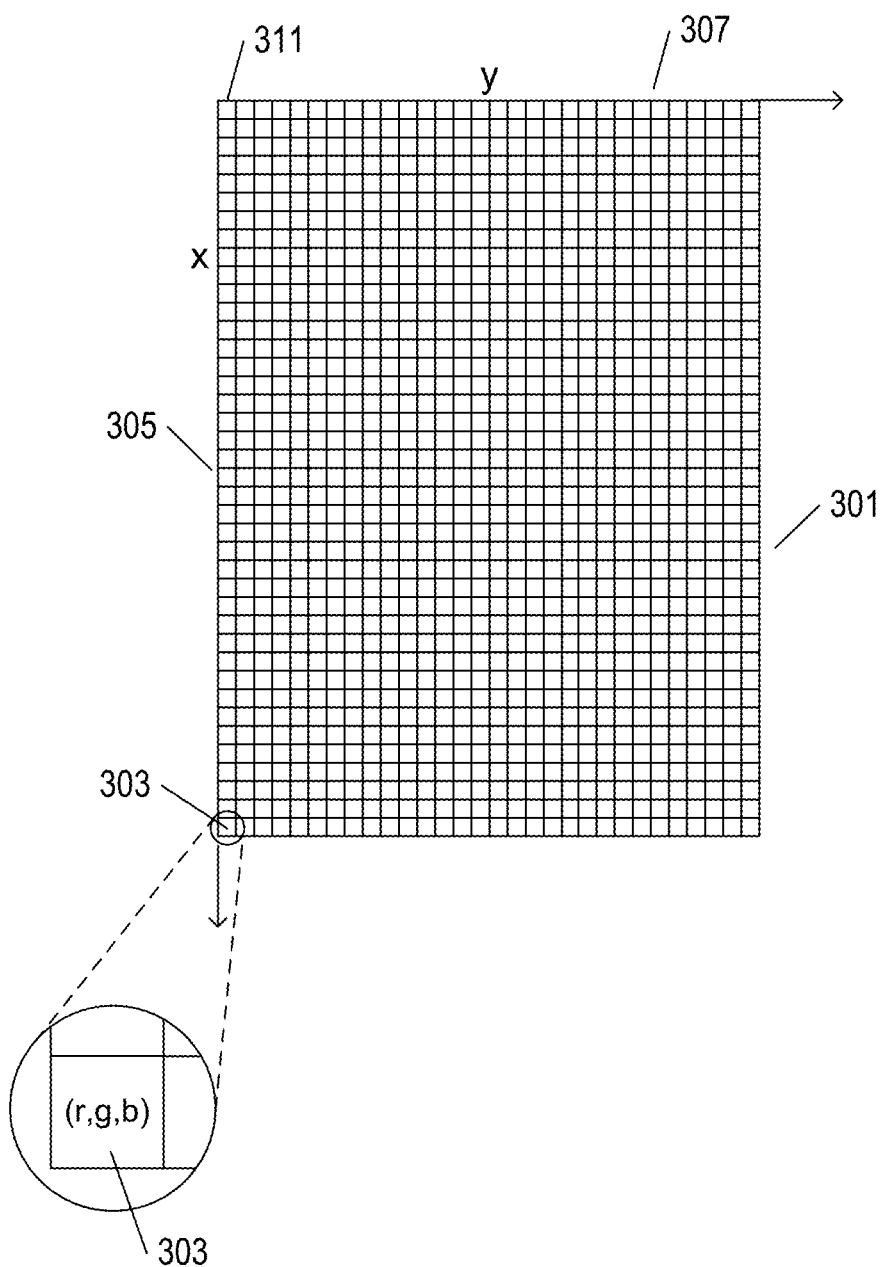
FIG. 20 illustrates a typical digitally encoded image, in accordance with one or more aspects of the present disclosure.

FIGS. 20-29 illustrate image processing techniques, structures, and data that may be used to supplement the description above. FIG. 20 may illustrate a typical digitally encoded image. The encoded image comprises a two dimensional array of pixels 301. Each small square, such as square 303, may represent a pixel, generally defined as the smallest-granularity portion of an image that is numerically specified in the digital encoding. Each pixel is a location, generally represented as a pair of numeric values corresponding to orthogonal x and y axes 305 and 307, respectively. Thus, for example, pixel 303 has x, y coordinates (39,0), while pixel 311 has coordinates (0,0). In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 20, each pixel is associated with three values, or coordinates (r,g,b), which specify the red, green, and blue intensity components of the color to be displayed in the region corresponding to the pixel.

Figure 21:
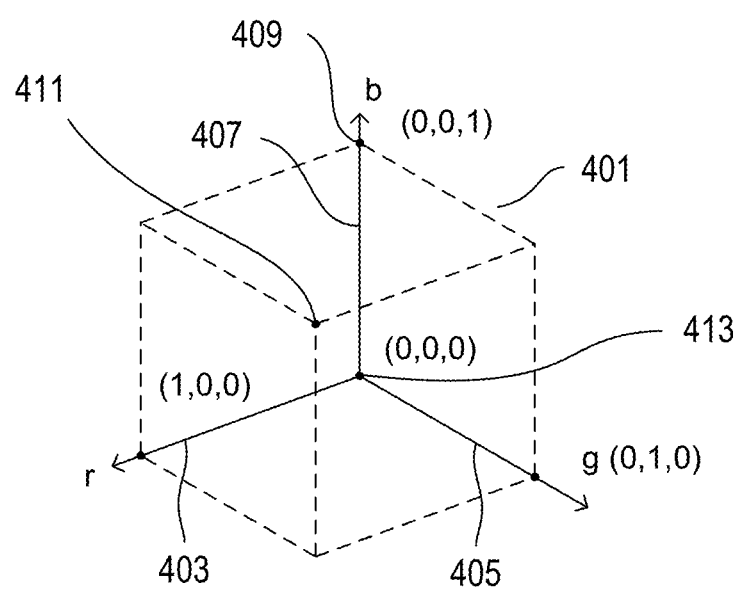
FIG. 21 illustrates one version of the RGB color model, in accordance with one or more aspects of the present disclosure.

FIG. 21 illustrates one version of the RGB color model. The entire spectrum of colors is represented, as discussed above with reference to FIG. 20, by a three-primary-color coordinate (r,g,b). The color model can be considered to correspond to points within a unit cube 401 within a three-dimensional color space defined by three orthogonal axes: (1) r 403; (2) g 405; and (3) b 407. Thus, the individual color coordinates range from 0 to 1 along each of the three color axes. The pure blue color, for example, of greatest possible intensity corresponds to the point 409 on the b axis with coordinates (0,0,1). The color white corresponds to the point 411, with coordinates (1,1,1) and the color black corresponds to the point 413, the origin of the coordinate system, with coordinates (0,0,0).

Figure 22:
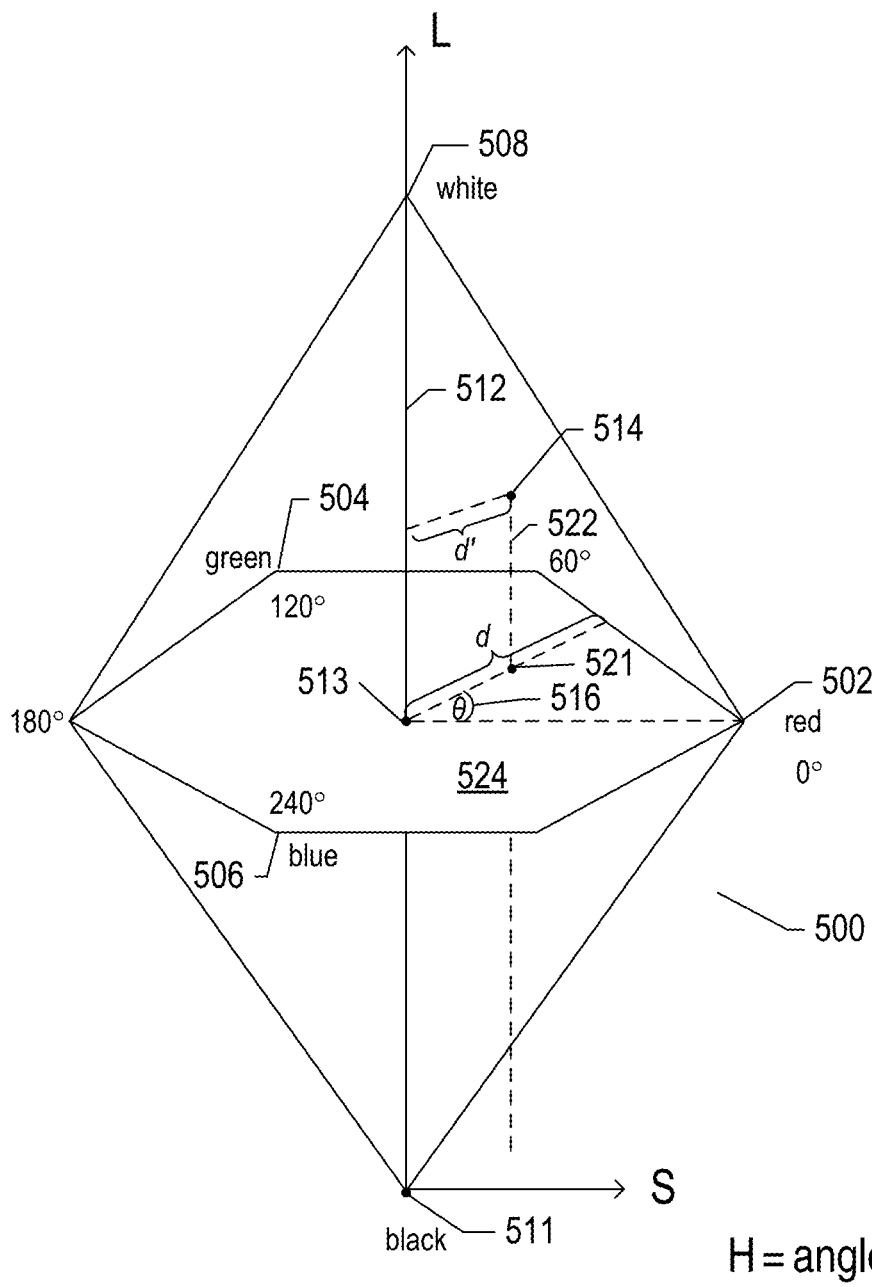
FIG. 22 shows a different color model, referred to as the "hue-saturation-lightness" ("HSL") color model, in accordance with one or more aspects of the present disclosure.

FIG. 22 shows a different color model, referred to as the "hue-saturation-lightness" ("HSL") color model. In this color model, colors are contained within a three-dimensional bi-pyramidal prism 500 with a hexagonal cross section. Hue (h) is related to the dominant wavelength of a light radiation perceived by an observer. The value of the hue varies from 0° to 360° beginning with red 502 at 0°, passing through green 504 at 120°, blue 506 at 240°, and ending with red 502 at 660°. Saturation (s), which ranges from 0 to 1, is inversely related to the amount of white and black mixed with a particular wavelength, or hue. For example, the pure red color 502 is fully saturated, with saturation s=1.0, while the color pink has a saturation value less than 1.0 but greater than 0.0, white 508 is fully unsaturated, with s=0.0, and black 511 is also fully unsaturated, with s=0.0. Fully saturated colors fall on the perimeter of the middle hexagon that includes points 502, 504, and 506. A gray scale extends from black 511 to white 508 along the central vertical axis 512, representing fully unsaturated colors with no hue but different proportional combinations of black and white. For example, black 511 contains 100% of black and no white, white 508 contains 100% of white and no black and the origin 513 contains 50% of black and 50% of white. Lightness (l), or luma, represented by the central vertical axis 512, indicates the illumination level, ranging from 0 at black 511, with l=0.0, to 1 at white 508, with l=1.0. For an arbitrary color, represented in FIG. 22 by point 514, the hue is defined as angle θ 516, between a first vector from the origin 513 to point 502 and a second vector from the origin 513 to point 521 where a vertical line 522 that passes through point 514 intersects the plane 524 that includes the origin 513 and points 502, 504, and 506. The saturation is represented by the ratio of the distance of representative point 514 from the vertical axis 512, d', divided by the length of a horizontal line passing through point 521 from the origin 513 to the surface of the bi-pyramidal prism 500, d. The lightness is the vertical distance from representative point 514 to the vertical level of the point representing black 511. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \mod 6\right), & \text{when } C_{max} = r \\ 60° \times \left(\frac{b-r}{\Delta} + 2\right), & \text{when } C_{max} = g \\ 60° \times \left(\frac{r-g}{\Delta} + 4\right), & \text{when } C_{max} = b \end{cases}, \text{ and}$$

$$s = \begin{cases} 0, & \Delta = 0 \\ \frac{\Delta}{1 - |2l-1|}, & \text{otherwise} \end{cases},$$

where r, g, and b values are intensities of red, green, and blue primaries normalized to the range [0, 1]; $C_{max}$ is a normalized intensity value equal to the maximum of r, g, and b; $C_{min}$ is a normalized intensity value equal to the minimum of r, g, and b; and Δ is defined as $C_{max} - C_{min}$.

Figure 23:
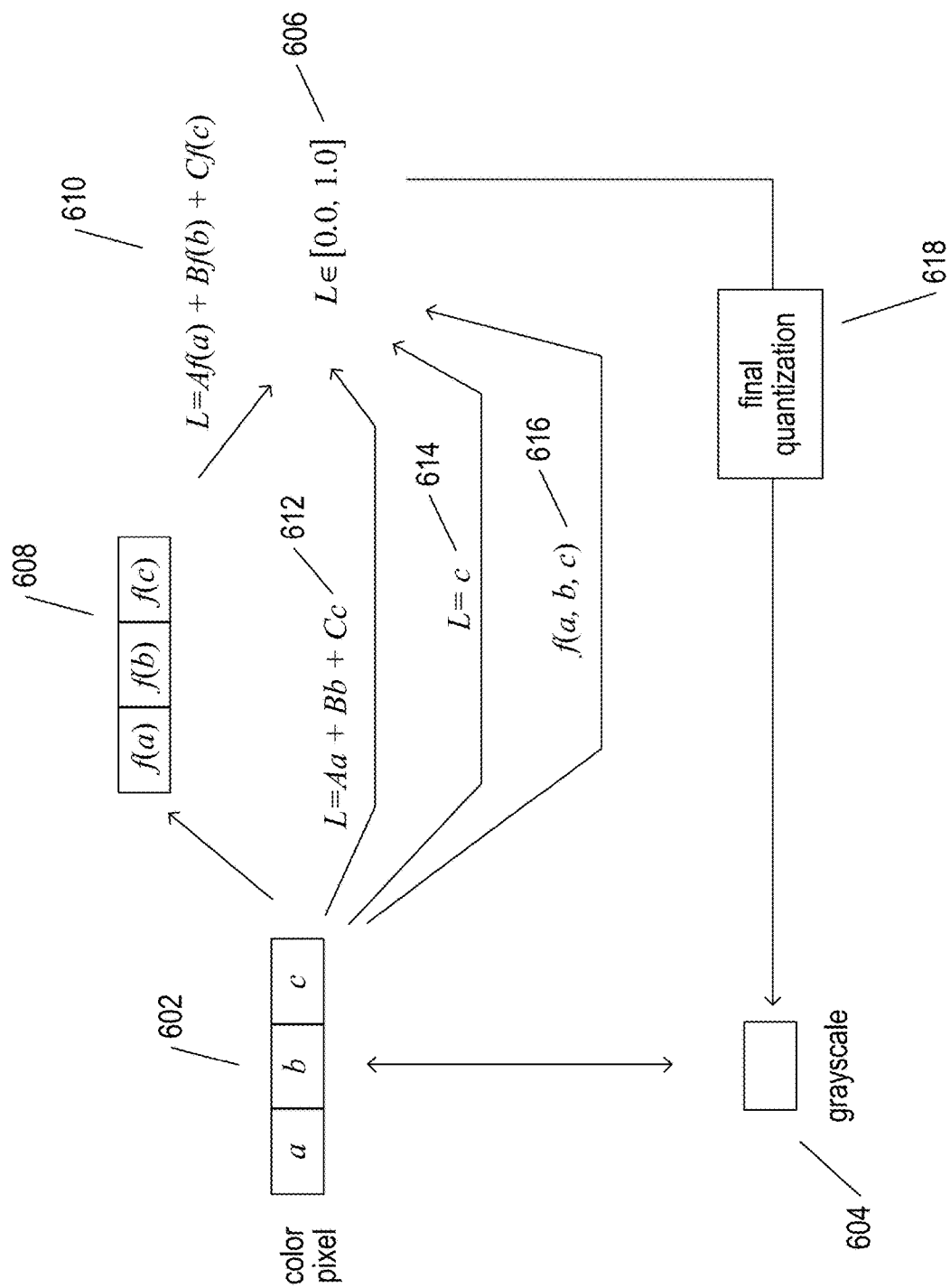
FIG. 23 illustrates generation of a grayscale or binary image from a color image, in accordance with one or more aspects of the present disclosure.

FIG. 23 illustrates generation of a grayscale or binary image from a color image. In a color image, each pixel is generally associated with three values: a, b, and c 602. Different color models employ different values of a, b, and c to represent a particular color. A grayscale image includes only a single intensity value 604 for each pixel. A binary image is a special case of a grayscale image with only two different intensity values, 0 and 1. Commonly, grayscale images may have 256 or 65,536 different intensity values, with each pixel represented by a byte or 16-bit word, respectively. Thus, to transform a color image to grayscale, the three values a, b, and c in the color pixels need to be translated to single intensity values for the grayscale or binary image. In a first step, the three color values a, b, and c are transformed to a luminosity value L, generally in a range of [0.0, 1.0] 606. For certain color models, a function is applied to each of the color values 608 and the results are summed 610 to produce the luminosity value. In other color models, each color value is multiplied by a coefficient and the results are summed 612 to produce the luminosity value. In yet other color systems, one of the three color values is, in fact, the luminosity value 614. Finally, in the general case, a function is applied to the three color values 616 to produce the luminosity value. The luminosity value is then quantized 618 to produce a grayscale intensity value within the desired range, generally [0, 255] for grayscale images and (0,1) for binary images.

Figure 24:
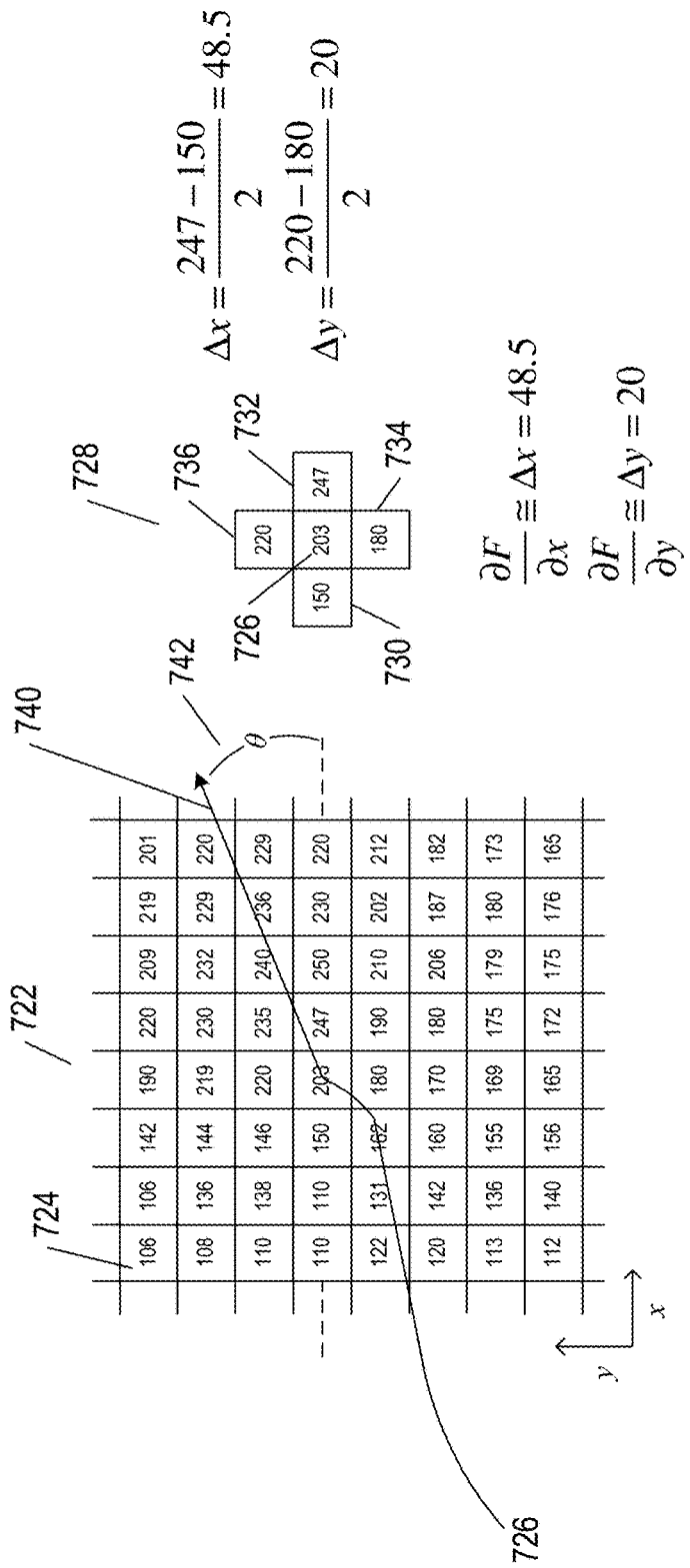
FIG. 24 illustrates a discrete computation of an intensity gradient, in accordance with one or more aspects of the present disclosure.

FIG. 24 illustrates a discrete computation of an intensity gradient. In FIG. 24, a small square portion 722 of a digital image is shown. Each cell, such as cell 724, represents a pixel and the numeric value within the cell, such as the value "106" in cell 724, represents a grayscale intensity. Consider pixel 726 with the intensity value "203." This pixel, and four contiguous neighbors, are shown in the cross-like diagram 728 to the right of the portion 722 of the digital image. Considering the left 730 and right 732 neighbor pixels, the change in intensity value in the x direction, Δx, can be discretely computed as:

$$\Delta x = \frac{247 - 150}{2} = 48.5.$$

Considering the lower 734 and upper 736 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 726:

$$\frac{\partial F}{\partial x} \cong \Delta x = 48.5.$$

The partial differential of the intensity function F with respect to the y coordinate at the central pixel 726 is estimated by Δy:

$$\frac{\partial F}{\partial y} \cong \Delta y = 20.$$

The intensity gradient at pixel 726 can then be estimated as:

$$\text{gradient} = \nabla F = \frac{\partial F}{\partial x} i + \frac{\partial F}{\partial y} j = 48.5i + 20j$$

where i and j are the unit vectors in the x and y directions. The magnitude of the gradient vector and the angle of the gradient vector are then computed as:

$$|gradient| = \sqrt{48.5^2 + 20^2} = 52.5$$

$$\theta = a\tan 2(20, 48.5) = 22.4.$$

The direction of the intensity gradient vector 740 and the angle θ 742 are shown superimposed over the portion 722 of the digital image in FIG. 24. Note that the gradient vector points in the direction of steepest increase in intensity from pixel 726. The magnitude of the gradient vector indicates an expected increase in intensity per unit increment in the gradient direction. Of course, because the gradient is only estimated by discrete operations, in the computation illustrated in FIG. 24, both the direction and magnitude of the gradient are merely estimates.

Figure 25:
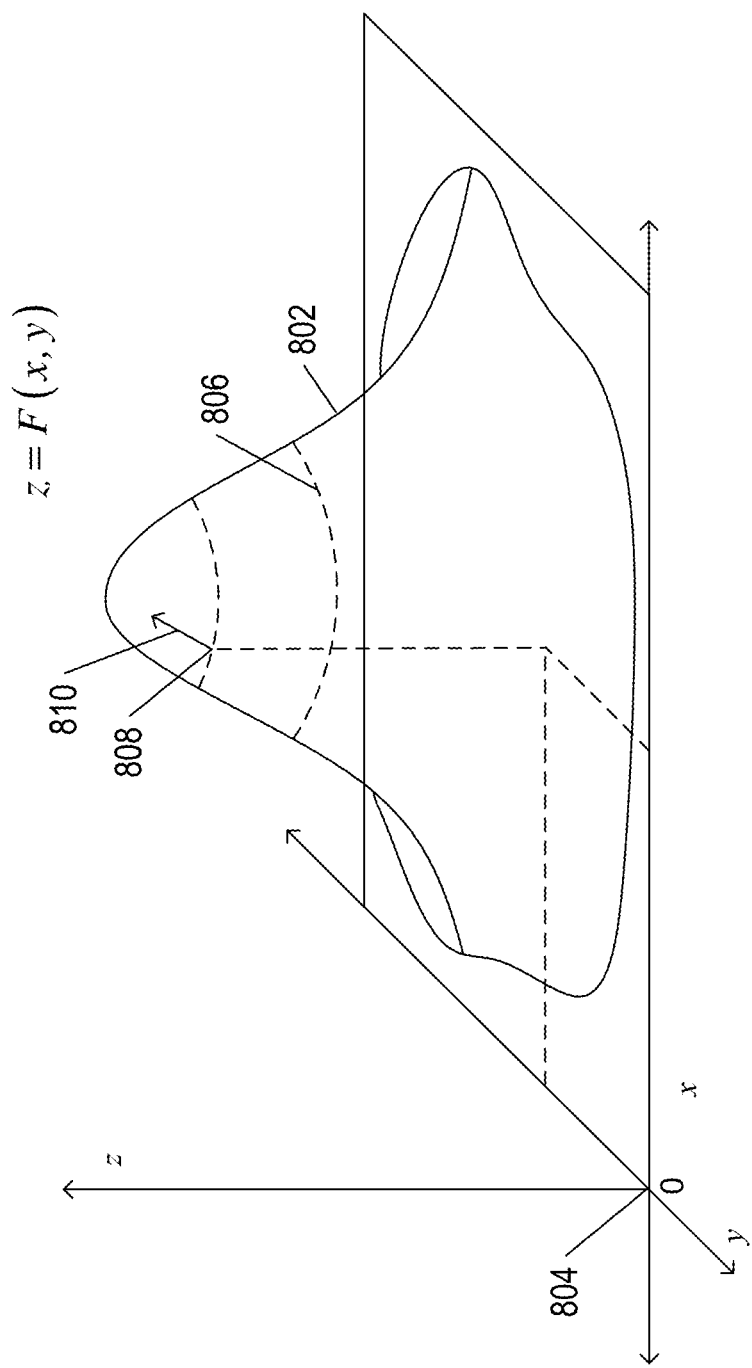
FIG. 25 illustrates a gradient computed for a point on a continuous surface, in accordance with one or more aspects of the present disclosure.

FIG. 25 illustrates a gradient computed for a point on a continuous surface. FIG. 25 illustrates a continuous surface z=F(x,y). The continuous surface 802 is plotted with respect to a three-dimensional Cartesian coordinate system 804, and has a hat-like shape. Lines, such as contour line 806, can be plotted on the surface to indicate a continuous set of points with a constant z value. At a particular point 808 on a line plotted on the surface, the gradient vector 810 computed for the point is perpendicular to the line and points in the direction of the steepest increase along the surface from point 808. In general, an intensity gradient vector is oriented perpendicularly to an intensity edge, and the greater the magnitude of the gradient, the sharper the edge or the greatest difference in intensities of the pixels on either side of the edge.

Figure 26:
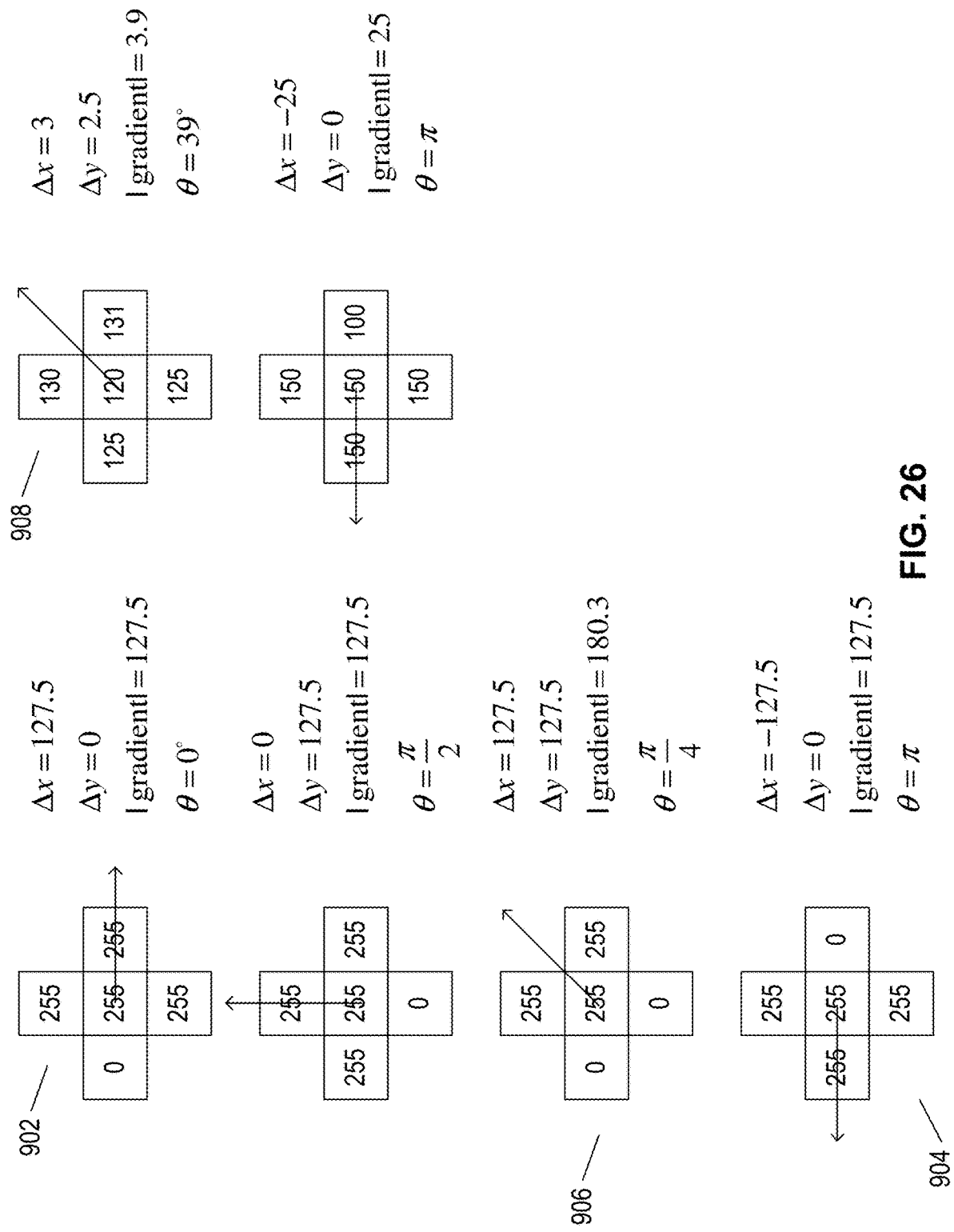
FIG. 26 illustrates a number of intensity-gradient examples, in accordance with one or more aspects of the present disclosure.

FIG. 26 illustrates a number of intensity-gradient examples. Each example, such as example 902, includes a central pixel for which the gradient is computed and the four contiguous neighbors used to compute Δx and Δy. The sharpest intensity boundaries are shown in the first column 904. In these cases, the magnitude of the gradient is at least 127.5 and, for the third case 906, 180.3. A relatively small difference across an edge, shown in example 908, produces a gradient with a magnitude of only 3.9. In all cases, the gradient vector is perpendicular to the apparent direction of the intensity edge through the central pixel.

Figure 27:
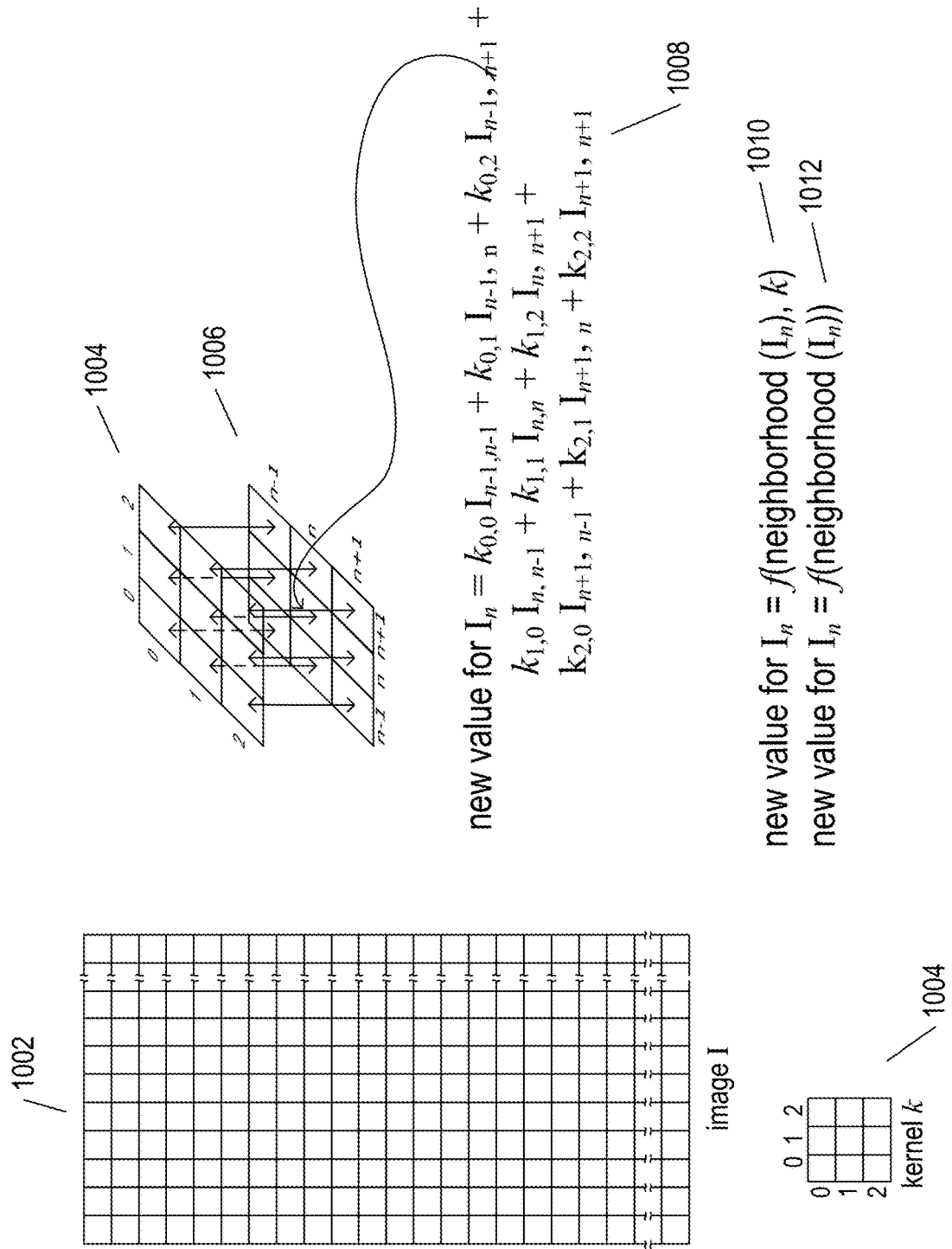
FIG. 27 illustrates application of a kernel to an image, in accordance with one or more aspects of the present disclosure.

FIG. 27 illustrates application of a kernel to an image. In FIG. 27, a small portion of an image 1002 is shown as a rectilinear grid of pixels. A small 3×3 kernel k 1004 is shown below the representation of image I 1002. A kernel is applied to each pixel of the image. In the case of a 3×3 kernel, such as kernel k 1004 shown in FIG. 27, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1004 is computationally layered over a neighborhood of the pixel to which the kernel is applied 1006 having the same dimensions, in pixels, as the kernel. Application of the kernel to the neighborhood of the pixel to which the kernel is applied produces a new value for the pixel in a transformed image produced by applying the kernel to pixels of the original image. In certain types of kernels, the new value for the pixel to which the kernel is applied, is obtained as the sum of the products of the kernel value and pixel aligned with the kernel value 1008. In other cases, the new value for the pixel is a more complex function of the neighborhood about the pixel and the kernel 1010. In yet other types of image processing, a new value for a pixel is generated by a function applied to the neighborhood of the pixel, without using a kernel 1012.

Figure 28:
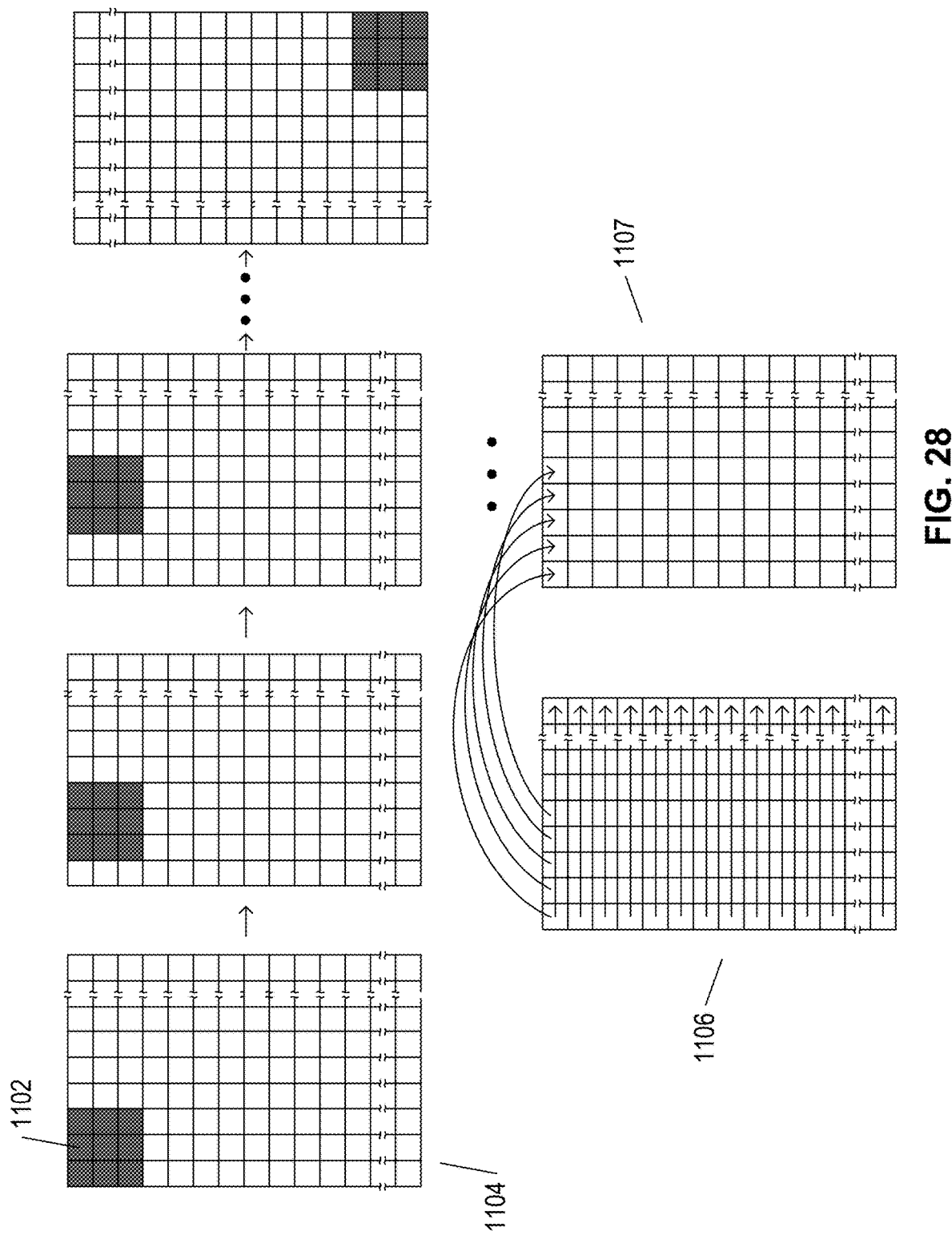
FIG. 28 illustrates convolution of a kernel with an image, in accordance with one or more aspects of the present disclosure.

FIG. 28 illustrates convolution of a kernel with an image. In general, the kernel is sequentially applied to each pixel of an image, in some cases, into each non-edge pixel of an image; in other cases, to produce new values for a transformed image. In FIG. 28, a 3×3 kernel, shown by shading 1102, is sequentially applied to the first row of non-edge pixels in an image 1104. Each new value generated by application of a kernel to a pixel in the original image 1106 is then placed into the transformed image 1107. In other words, the kernel is sequentially applied to the original neighborhoods of each pixel in the original image to produce the transformed image. This process is referred to as "convolution," and is loosely related to the mathematical convolution operation computed by multiplying Fourier-transformed images and then carrying out an inverse Fourier transform on the product.

Figure 29:
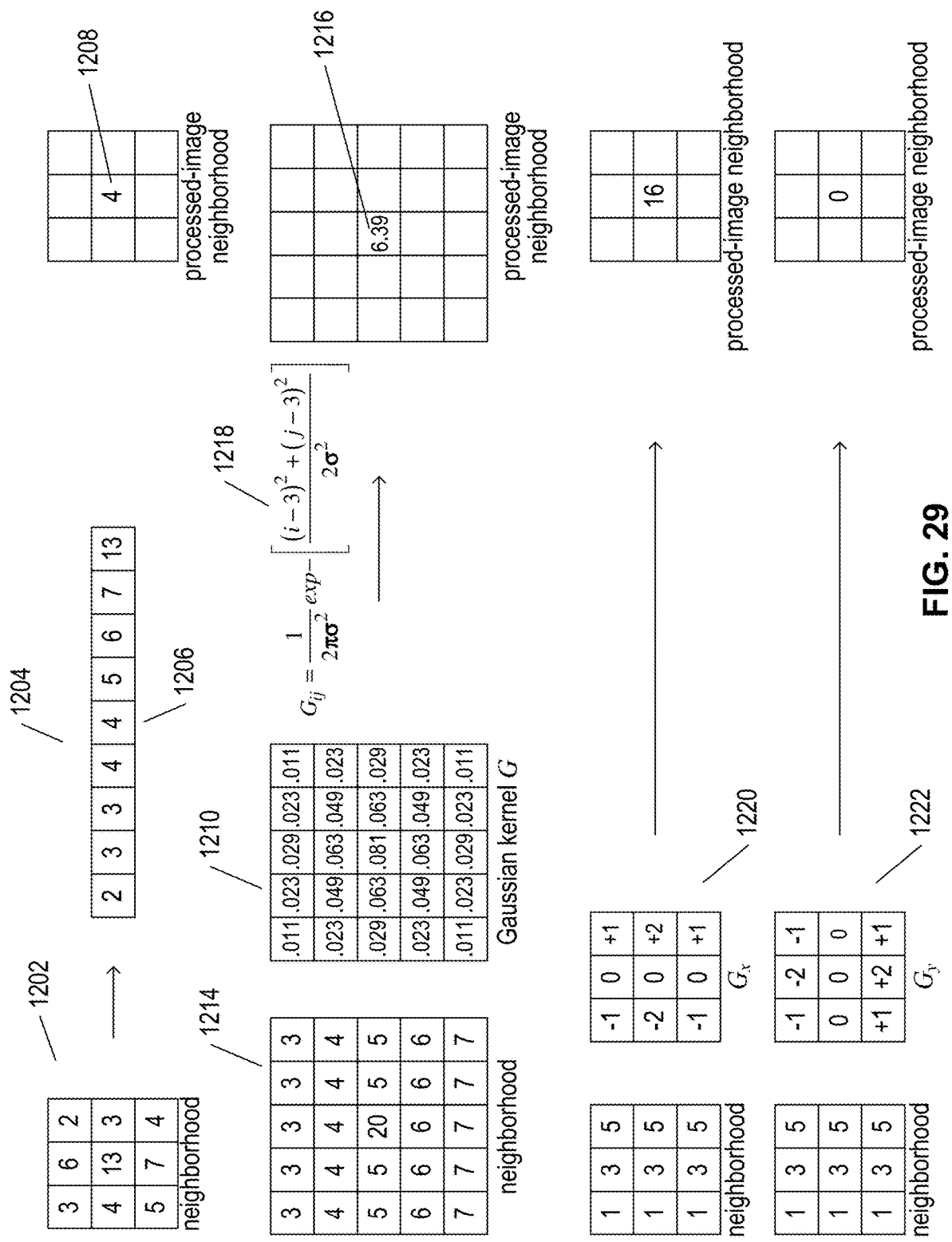
FIG. 29 illustrates some example kernel and kernel-like image-processing techniques, in accordance with one or more aspects of the present disclosure.

FIG. 29 illustrates some example kernel and kernel-like image-processing techniques. In the process referred to as "median filtering," the intensity values in a neighborhood of the original image 1202 are sorted 1204 in ascending-magnitude order and the median value 1206 is selected as a new value 1208 for the corresponding neighborhood of the transformed image. Gaussian smoothing and denoising involves applying a Gaussian kernel 1210 to each neighborhood 1214 of the original image to produce the value for the central pixel of the neighborhood 1216 in the corresponding neighborhood of the processed image. The values in the Gaussian kernel are computed by an expression such as expression 1218 to produce a discrete representation of a Gaussian surface above the neighborhood formed by rotation of a bell-shaped curve about a vertical axis coincident with the central pixel. The horizontal and vertical components of the image gradient for each pixel can be obtained by application of the corresponding $G_x$ 1220 and $G_y$ 1222 gradient kernels. These are only three of the many different types of convolution-based image-processing techniques.

Figure 30B:
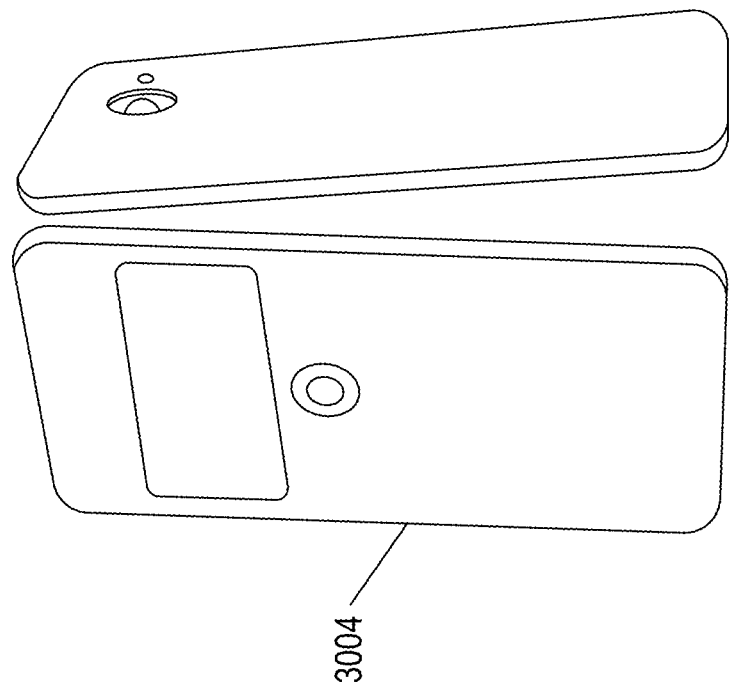
FIG. 30B illustrates another example computing device, in accordance with one or more aspects of the present disclosure.
Figure 30A:
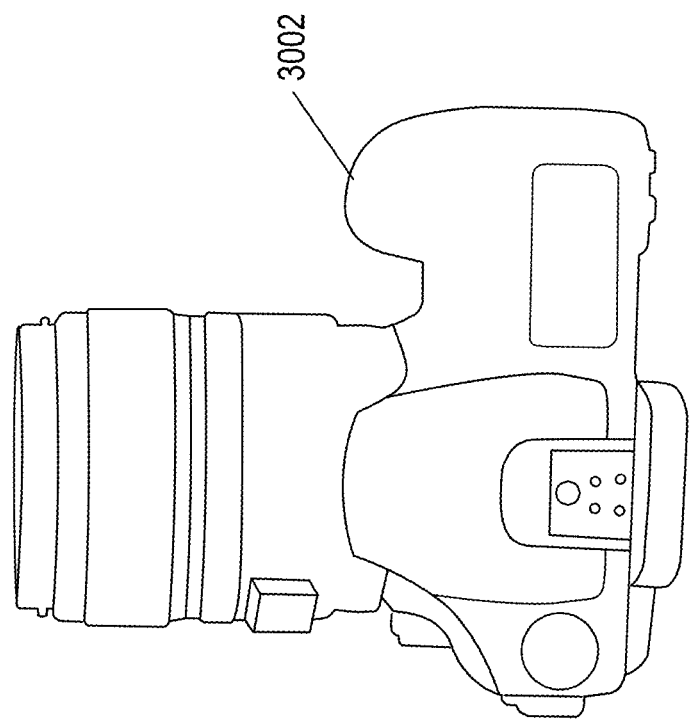
FIG. 30A illustrates an example computing device in accordance with one or more aspects of the present disclosure.

FIGS. 30A-B illustrate two different types of hand-held imaging devices. FIG. 30A illustrate a digital camera 3002 and FIG. 30B illustrates an example smart phone 3004. The digital camera includes an objective lens and a shutter button that, when depressed by a user, results in capture of a digital image corresponding to reflected light entering the lens of the digital camera. On the back side of the digital camera, viewed by a user when the user is holding a camera to capture digital images, the digital camera includes a viewfinder and an LCD viewfinder screen. The viewfinder allows a user to directly view the image currently generated by the camera lens, while the LCD viewfinder screen provides an electronic display of the image currently produced by the camera lens. Generally, the camera user adjusts the camera focus, using annular focus-adjusting features while looking through the viewfinder or observing the LCD viewfinder screen in order to select a desired image prior to depressing the shutter button to digitally capture the image and store the image in electronic memory within the digital camera.

FIG. 30B shows a typical smart phone 3004 from the front side and from the back side. The back side includes a digital-camera lens and digital light meter and/or proximity sensor. The front side of the smart phone may, under application control, display the currently received image, similar to the LCD viewfinder display of the digital camera, as well as a touch-sensitive shutter-button, input of a touch to which captures a digital image within the smart-phone memory.

Figure 31:
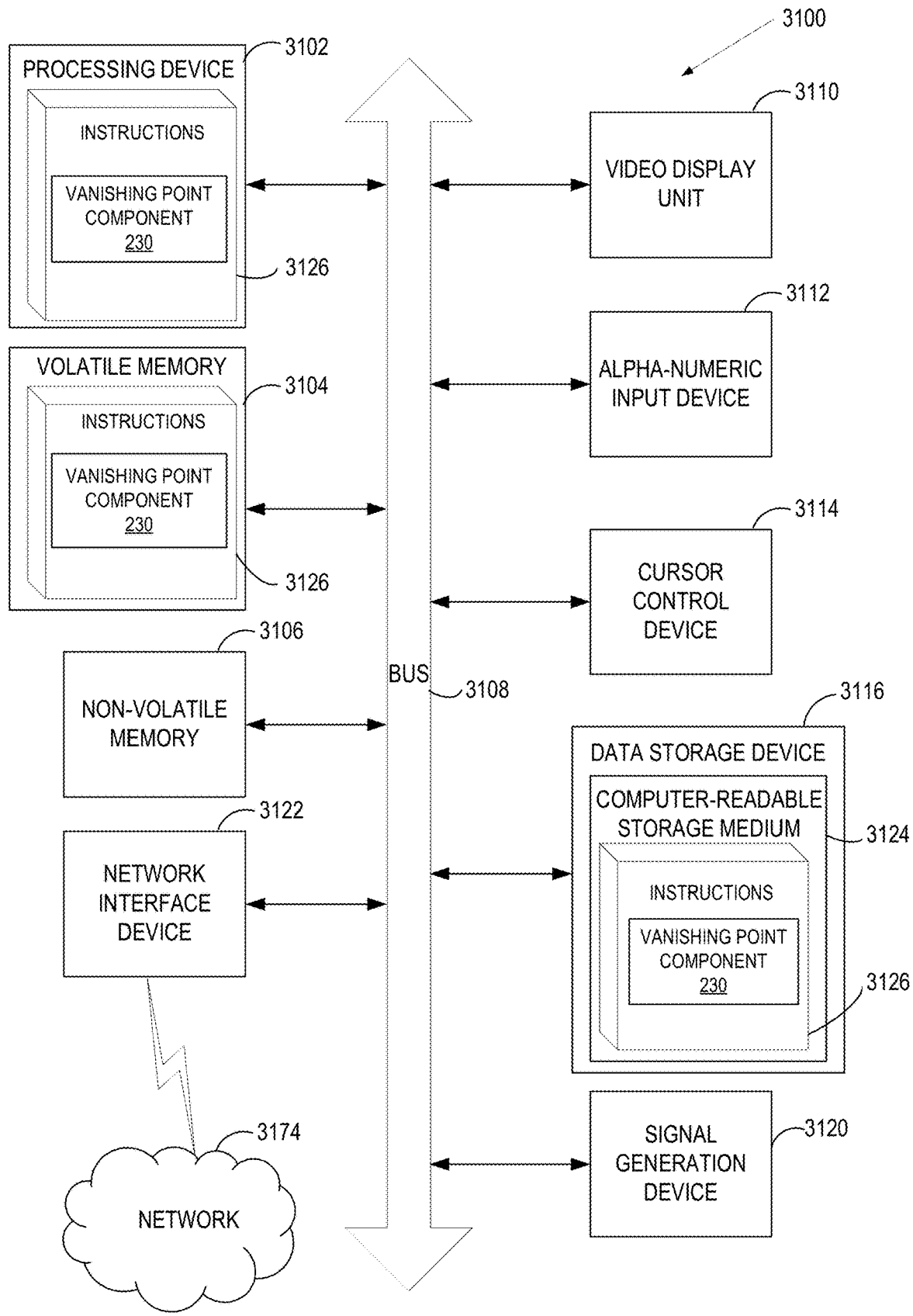
FIG. 31 illustrates a block diagram of an illustrative computing device operating in accordance with the examples of the present disclosure.

FIG. 31 depicts a block diagram of a computer system operating in accordance with one or more aspects of the present disclosure. In various illustrative examples, computer system 3100 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 3100 may be connected (e.g., via a network, such as a Local Area Network (LAN), an intranet, an extranet, or the Internet) to other computer systems. Computer system 3100 may operate in the capacity of a server or a client computer in a client-server environment, or as a peer computer in a peer-to-peer or distributed network environment. Computer system 3100 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 3100 may include a processing device 3102, a volatile memory 3104 (e.g., random access memory (RAM)), a non-volatile memory 3106 (e.g., read-only memory (ROM) or electrically-erasable programmable ROM (EEPROM)), and a data storage device 3116, which may communicate with each other via a bus 3108.

Processing device 3102 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 3100 may further include a network interface device 3122. Computer system 3100 also may include a video display unit 3110 (e.g., an LCD), an alphanumeric input device 3112 (e.g., a keyboard), a cursor control device 3114 (e.g., a mouse), and a signal generation device 3120.

Data storage device 3116 may include a non-transitory computer-readable storage medium 3124 on which may store instructions 3126 encoding any one or more of the methods or functions described herein, including instructions for implementing methods 1900 and the components and modules illustrated in FIG. 2.

Instructions 3126 may also reside, completely or partially, within volatile memory 3104 and/or within processing device 3102 during execution thereof by computer system 3100, hence, volatile memory 3104 and processing device 3102 may also constitute machine-readable storage media.

While computer-readable storage medium 3124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 1900 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving an image comprising one or more documents;
detecting a set of lines in the image;
identifying a plurality of intersection points corresponding to the set of lines;
determining a plurality of vanishing points based on the plurality of intersection points, the plurality of vanishing points comprising a first vanishing point and a second vanishing point;
selecting, by a processing device from the detected set of lines, a first pair of lines based on the first vanishing point and a second pair of lines based on the second vanishing point;
generating a candidate polygon that comprises the first pair of lines and the second pair of lines;
evaluating the candidate polygon based on a parameter associated with one or more of the plurality of vanishing points; and
indicating the candidate polygon represents a contour of one of the one or more documents.

2. The method of claim 1, wherein the candidate polygon comprises a closed quadrilateral that extends past a boundary of the image and indicates a contour of one of the one or more documents.

3. The method of claim 1, wherein detecting the set of lines in the image comprises identifying a plurality of lines that are positioned along textual lines of the one or more documents in the image.

4. The method of claim 1, wherein identifying the plurality of intersection points comprises:
selecting a pair of line segments from the set of lines in the image;
identifying an intersection point for the pair of line segments, wherein the intersection point comprises a coordinate relative to the image; and
adding the coordinate to a set representing the plurality of intersection points.

5. The method of claim 1, wherein determining the plurality of vanishing points comprises:
detecting the first vanishing point based on a plurality of substantially horizontal lines in the image; and
detecting the second vanishing point based on a plurality of substantially vertical lines in the image.

6. The method of claim 1, wherein determining the plurality of vanishing points based on the plurality of intersection points comprises:
selecting a candidate intersection point from the plurality of intersection points;
determining a number of lines of the set of lines that correspond to the candidate intersection point, wherein a line corresponds to the candidate intersection point when the line points toward the candidate intersection point within a predetermined angular offset; and
replacing a current vanishing point with the candidate intersection point in response to the number of lines that corresponds to the candidate intersection point exceeding a number of lines corresponding to the current vanishing point.

7. The method of claim 1, wherein detecting the set of lines in the image comprises:
detecting a first set of lines that are substantially horizontal;
detecting a second set of lines that are substantially vertical; and
determining an orientation of a document in the image based on a weight quality of the first set of lines and the second set of lines.

8. The method of claim 7, wherein selecting the first pair of lines comprises selecting a pair of lines that are substantially horizontal based on a horizontal vanishing point, and wherein selecting the second pair of lines comprises selecting a pair of lines that are substantially vertical based on a vertical vanishing point.

9. The method of claim 1, wherein evaluating the candidate polygon based on the parameter comprises evaluating the candidate polygon based on multiple parameters selected from a set of parameters comprising:
a length of a side of the candidate polygon;
an area of the candidate polygon;
a coordinate of an internal angle of the candidate polygon;
a value of an internal angle of the candidate polygon;
a value of an external angle of convergence of the candidate polygon;
a ratio between a length of a side of the candidate polygon and a length of a corresponding line from the detected set of lines;
an aspect ratio of the candidate polygon;
an angle of inclination of a side of the candidate polygon with respect to an axis of the image;
a distance to the nearest vanishing point; and
a number of the set of lines corresponding to the nearest vanishing point.

10. The method of claim 9, wherein evaluating the candidate polygon further comprises evaluating the candidate polygon using a linear or non-linear combination of parameters from the set of parameters.

11. The method of claim 1, wherein detecting the set of lines in the image comprises:
calculating an intensity gradient of a plurality of points within the image, wherein a point comprises a pixel;
applying an edge thinning operation to the plurality of points to identify a set of points, wherein the edge thinning operation uses the intensity gradient and comprises a non-maximum suppression operation; and
organizing the set of points based on the intensity gradient, wherein the set of points comprises a point with a maximum intensity gradient;
extending the point with the maximum intensity gradient along an intensity edge in at least one direction to generate a line segment; and
adding the line segment to the set of lines.

12. The method of claim 1 further comprising, modifying the image based on the candidate polygon, wherein modifying the image comprises at least one of cropping the image based on the candidate polygon, rotating the image based on the candidate polygon, adjusting the perspective of the image based on the candidate polygon, and cutting the one or more documents from the image based on one or more candidate polygons.

13. The method of claim 1, further comprising:
receiving the image from a user device comprising an image sensor;
reducing a resolution of the image, wherein reducing the resolution comprises preserving an aspect ratio of the image and reducing a length and a width of the image; and
smoothing the image.

14. A system comprising:
a memory;
a processing device operatively coupled to the memory, the processing device to:

receive an image comprising one or more documents;
detect a set of lines in the image;
identify a plurality of intersection points corresponding to the set of lines;
determine a plurality of vanishing points based on the plurality of intersection points, the plurality of vanishing points comprising a first vanishing point and a second vanishing point;
select, from the detected set of lines, a first pair of lines based on the first vanishing point and a second pair of lines based on the second vanishing point;
generate a candidate polygon that comprises the first pair of lines and the second pair of lines;
evaluate the candidate polygon based on a parameter associated with one or more of the plurality of vanishing points; and
indicate the candidate polygon represents a contour of one of the one or more documents.

15. The system of claim 14, wherein the candidate polygon comprises a closed quadrilateral that extends past a boundary of the image and indicates a contour of a document.

16. The system of claim 14, wherein to detect the set of lines in the image comprises the processing device to identify a plurality of lines that are positioned along textual lines of the one or more documents in the image.

17. The system of claim 14, wherein to identify the plurality of intersection points comprises the processing device to:
select a pair of line segments from the set of lines in the image;
identify an intersection point for the pair of line segments, wherein the intersection point comprises a coordinate relative to the image; and
add the coordinate to a set representing the plurality of intersection points.

18. A non-transitory machine-readable storage medium storing instructions that cause a processing device to:
receive an image comprising one or more documents;
detect a set of lines in the image;
identify a plurality of intersection points corresponding to the set of lines;
determine a plurality of vanishing points based on the plurality of intersection points, the plurality of vanishing points comprising a first vanishing point and a second vanishing point;
select, from the detected set of lines, a first pair of lines based on the first vanishing point and a second pair of lines based on the second vanishing point;
generate a candidate polygon that comprises the first pair of lines and the second pair of lines;
evaluate the candidate polygon based on a parameter associated with one or more of the plurality of vanishing points; and
indicate the candidate polygon represents a contour of one of the one or more documents.

19. The non-transitory machine-readable storage medium of claim 18, wherein the candidate polygon comprises a closed quadrilateral that extends past a boundary of the image and indicates a contour of a document.

20. The non-transitory machine-readable storage medium of claim 18, wherein to detect the set of lines in the image comprises the processing device to identify a plurality of lines that are positioned along textual lines of the one or more documents in the image.

* * * * *